United States Patent
Lefebvre et al.

(10) Patent No.: US 10,865,700 B2
(45) Date of Patent: Dec. 15, 2020

(54) AIR INTAKE AND EXHAUST SYSTEMS FOR A SNOWMOBILE ENGINE

(71) Applicant: BOMBARDIER RECREATIONAL PRODUCTS INC., Valcourt (CA)

(72) Inventors: Michel Lefebvre, Valcourt (CA); Jonathan Claveau, Cowansville (CA); Yvon Bedard, Orford (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 233 days.

(21) Appl. No.: 16/031,126

(22) Filed: Jul. 10, 2018

(65) Prior Publication Data

US 2019/0063304 A1  Feb. 28, 2019

Related U.S. Application Data

(60) Provisional application No. 62/530,553, filed on Jul. 10, 2017.

(51) Int. Cl.
*B62M 27/02* (2006.01)
*F02B 29/04* (2006.01)
(Continued)

(52) U.S. Cl.
CPC ......... *F02B 29/0425* (2013.01); *B62M 27/02* (2013.01); *B62M 29/00* (2013.01);
(Continued)

(58) Field of Classification Search
CPC ......... F02B 29/0425; F02M 35/10157; F02M 35/162; B62M 2027/023; B62M 27/00; B62M 29/00
See application file for complete search history.

(56) References Cited

U.S. PATENT DOCUMENTS

| 4,169,355 A | 10/1979 | Walsham et al. |
| 4,387,570 A | 6/1983 | Iwamoto et al. |

(Continued)

FOREIGN PATENT DOCUMENTS

| CA | 2496716 C | 5/2007 |
| CA | 2462350 C | 5/2010 |

(Continued)

OTHER PUBLICATIONS

English machine translation of JP2005098220A prepared by EPO and received from the ISA/US with the Invitation to Pay Additional Fees dated Sep. 30, 2019.
(Continued)

*Primary Examiner* — Tony H Winner
(74) *Attorney, Agent, or Firm* — BCF LLP

(57) ABSTRACT

A snowmobile has a frame including a tunnel having a passage therethrough, at least one ski, an engine having an engine air inlet and an engine exhaust outlet, and a drive track operatively connected thereto and disposed at least partly below the tunnel around a rear suspension. A heat exchanger connected to the tunnel has heat exchanger engine air inlet and outlet, a cooling air inlet and a cooling air outlet fluidly connected between the cooling air inlet and the passage. A snowmobile has a pipe fluidly connected to the exhaust outlet and having first and second pipe outlets. The snowmobile further has a muffler having first and second muffler inlets and a muffler outlet, a turbocharger, first and second exhaust flow passages, and a valve disposed between the pipe and the first muffler inlet for selectively controlling the flow of exhaust gas flowing through the first exhaust flow path.

13 Claims, 18 Drawing Sheets

(51) Int. Cl.
*F02M 35/16* (2006.01)
*B62M 29/00* (2006.01)
*F02M 35/10* (2006.01)

(52) U.S. Cl.
CPC .... *F02M 35/10157* (2013.01); *F02M 35/162* (2013.01); *B62M 2027/023* (2013.01)

(56) References Cited

U.S. PATENT DOCUMENTS

| | | |
|---|---|---|
| 4,827,880 A | 5/1989 | Ban et al. |
| 5,215,068 A | 6/1993 | Kato |
| 5,992,552 A * | 11/1999 | Eto ........................ B62M 27/00 |
| | | 180/190 |
| 6,651,765 B1 | 11/2003 | Weinzierl |
| 6,973,985 B2 | 12/2005 | Yatagai et al. |
| 7,104,352 B2 | 9/2006 | Weinzierl |
| 7,134,520 B2 | 11/2006 | Yatagai et al. |
| 7,198,127 B2 | 4/2007 | Yatagai et al. |
| 7,222,689 B2 | 5/2007 | Yatagai et al. |
| 7,264,075 B2 | 9/2007 | Schuemacher et al. |
| 7,472,771 B2 | 1/2009 | Yatagai et al. |
| 8,141,357 B2 | 3/2012 | Yamagata et al. |
| 9,103,272 B2 | 8/2015 | Buckland et al. |
| 2002/0027029 A1 * | 3/2002 | Yatagai ................. B62M 27/02 |
| | | 180/182 |
| 2003/0205423 A1 * | 11/2003 | Weinzierl ............... B62M 27/02 |
| | | 180/182 |
| 2005/0205319 A1 * | 9/2005 | Yatagai ................. B62M 27/02 |
| | | 180/190 |
| 2009/0250281 A1 | 10/2009 | Weinzierl |
| 2011/0036331 A1 | 2/2011 | Pocha |
| 2016/0016639 A1 * | 1/2016 | Pard ...................... B62D 55/24 |
| | | 180/193 |
| 2016/0090905 A1 | 3/2016 | Kai et al. |
| 2017/0241326 A1 | 8/2017 | Vezina et al. |

FOREIGN PATENT DOCUMENTS

| | | |
|---|---|---|
| JP | 2005098220 A | 4/2005 |
| WO | 2014005130 A2 | 1/2014 |

OTHER PUBLICATIONS

Invitation to Pay Additional Fees issued from the ISA/US; Lee W. Young; dated Sep. 30, 2019.

* cited by examiner

AIR INTAKE AND EXHAUST SYSTEMS FOR A SNOWMOBILE ENGINE

CROSS-REFERENCE

The present application claims priority from U.S. Provisional Patent Application No. 62/530,553, entitled "Air Intake and Exhaust Systems for a Snowmobile Engine", filed Jul. 10, 2017, the entirety of which is incorporated herein by reference.

FIELD OF THE TECHNOLOGY

The present technology relates to air intake and exhaust systems for a snowmobile.

BACKGROUND

Design of air intake and exhaust systems are of importance for internal combustion engines. The efficiency of the combustion process in an internal combustion engine can be increased by decreasing the temperature of the air entering the engine for combustion. A decrease in air intake temperature provides a denser intake charge to the engine and allows more air and fuel to be combusted per engine cycle, increasing the output power of the engine. In addition, the efficiency of the combustion process can also be increased by compressing the air entering the engine for combustion. An increase in air intake pressure also provides a denser intake charge compared to the air from the atmosphere and allows more air and fuel to be combusted per engine cycle, and in turn increasing the output power of the engine. The compression of the air may be of particular importance when the internal combustion engine is operated in environments where atmospheric pressure is low or when the air gets thinner, such as when the engine is operated at high altitudes. The compression of the air can be performed using a turbocharger operated using the flow of exhaust gas of the engine. However, the efficiency and the performance of some engines may be hindered under certain circumstances by the presence of a turbocharger because of an increased amount of backpressure in their exhaust system.

There is thus a need for air intake systems capable of increasing air density before its entry into the engine for the combustion process, and for exhaust systems for internal combustion engines that are coupled to a turbocharger that could reduce an amount of backpressure under certain circumstances.

SUMMARY

It is an object of the present technology to ameliorate at least some of the inconveniences present in the prior art.

According to one aspect of the present technology, there is provided a snowmobile having a frame including a tunnel. The tunnel has a passage defined therethrough. The snowmobile further has at least one ski connected to the frame, an engine supported by the frame and having an engine air inlet, a rear suspension assembly operatively connected to the tunnel and a drive track supported by the rear suspension assembly and disposed at least in part below the tunnel. The drive track is operatively connected to the engine. The snowmobile further includes a heat exchanger connected to the tunnel. The heat exchanger includes a heat exchanger engine air inlet fluidly connected to atmosphere, a heat exchanger engine air outlet fluidly connected between the heat exchanger engine air inlet and the engine air inlet, a cooling air inlet fluidly connected to the atmosphere, and a cooling air outlet fluidly connected between the cooling air inlet and the passage of the tunnel.

In some implementations, air flowing from the heat exchanger engine air inlet to the heat exchanger engine air outlet is cooled by air flowing from the cooling air inlet to the cooling air outlet.

In some implementations, the air flowing inside the heat exchanger from the heat exchanger engine air inlet to the heat exchanger engine air outlet is fluidly separate from the air flowing inside the heat exchanger from the cooling air inlet to the cooling air outlet.

In some implementations, the snowmobile further includes an intercooler disposed inside the heat exchanger. The intercooler defines a first path for air flowing from the cooling air inlet to the cooling air outlet, and the intercooler defines a second path for air flowing from the heat exchanger engine air inlet to the heat exchanger engine air outlet. The first path is fluidly separate from the second path, and the first path is in thermal communication with the second path.

In some implementations, the first path is perpendicular to the second path.

In some implementations, the tunnel comprises a left side portion and a right side portion, and the cooling air inlet and the cooling air outlet are disposed laterally between the left and right side portions.

In some implementations, the tunnel further includes a top portion connected between the left and right side portions, and the cooling air inlet and the cooling air outlet are disposed vertically higher than the top portion.

In some implementations, when the snowmobile is being propelled, rotation of the drive track creates a low pressure zone near the passage. The low pressure zone induces air to flow into the heat exchanger through the cooling air inlet, exit the heat exchanger through the cooling air outlet and to flow through the passage.

In some implementations, the passage is defined in the top portion, a protrusion is defined rearwardly of the passage on a bottom face of the top portion, and the low pressure zone is forward of the protrusion.

In some implementations, the heat exchanger is connected to a forward portion of the tunnel.

In some implementations, the snowmobile further includes a front axle operatively connected between the engine and the drive track, the passage being above the front axle and being longitudinally aligned with the front axle.

In some implementations, the snowmobile further includes an air compressor fluidly connected between the atmosphere and the heat exchanger engine air inlet to deliver compressed air to the engine via the heat exchanger.

In some implementations, the air compressor is part of a turbocharger. The engine has an engine exhaust outlet fluidly connected to the turbocharger; and a flow of exhaust gas flows out of the engine through the engine exhaust outlet for operating the turbocharger, and then to the atmosphere via the turbocharger.

In some implementations of the present technology, the heat exchanger is placed on the top portion of the tunnel of the snowmobile. The heat exchanger is in fluid communication with the passage defined therethrough. The heat exchanger favours the transfer of heat from the compressed air coming out of the air compressor to a flow of air from the atmosphere flowing from the cooling air inlet to the cooling air outlet. As such, the heat exchanger cools down the compressed air before entering the engine via the engine air inlet. When the drive track of the snowmobile rotates below the passage, a zone of low pressure is formed near the passage and the air from the atmosphere is induced to flow through the heat exchanger from the cooling air inlet to the cooling air outlet. Using the rotation of the track for inducing the air from the atmosphere to flow through the heat exchanger may reduce the complexity of the snowmobile since no additional components, such as a fan, are required to induce the flow of the air through the heat exchanger.

According to another aspect of the present technology, there is provided a snowmobile including a frame, at least one ski connected to the frame, an engine supported by the frame. The engine has an engine air inlet and an engine exhaust outlet. The snowmobile further includes a pipe fluidly connected to the engine exhaust outlet for receiving a flow of exhaust gas from the engine, and the pipe further includes first and second pipe outlets. The snowmobile further has a muffler having a first muffler inlet, a second muffler inlet and a muffler outlet. A first exhaust flow path is defined from the first pipe outlet to the first muffler inlet, and a second exhaust flow path is defined from the second pipe outlet to the second muffler inlet. The snowmobile further includes a turbocharger fluidly connected along the second exhaust flow path between the second pipe outlet and the second muffler inlet, and a valve disposed between the pipe and the first muffler inlet for selectively controlling the flow of exhaust gas flowing through the first exhaust flow path.

In some implementations, the muffler includes first and second expansion chambers. The first muffler inlet is defined in the first expansion chamber. The second muffler inlet is defined in the second expansion chamber. Exhaust gas flowing along the first exhaust flow path flows in the first expansion chamber, then in the second expansion chamber, and then through the muffler outlet. The exhaust gas flowing along the second exhaust flow path flows in the second expansion chamber and then through the muffler outlet.

In some implementations, the turbocharger includes an air compressor fluidly connected to the engine air inlet; and the snowmobile further includes an air intake system fluidly connecting atmosphere to the engine. The air intake system includes the air compressor, a bypass conduit fluidly connected between the engine air inlet and a portion of the air intake system upstream of the air compressor for bypassing the air compressor, and a bypass valve selectively controlling a flow of air flowing in the bypass conduit.

In some implementations, the bypass valve selectively opens below a threshold operating condition of the engine.

In some implementations, the air intake system further includes a heat exchanger fluidly connected downstream from the air compressor for cooling compressed air delivered to the engine air inlet from the air compressor.

In some implementations, the snowmobile further has an intercooler disposed inside the heat exchanger.

In some implementations, the air intake system further includes a first chamber for receiving air from the atmosphere, and a second chamber fluidly connected between the first chamber and the air compressor.

In some implementations, the valve is a primary valve, and the snowmobile further includes a primary exhaust conduit fluidly connecting the first pipe outlet to the first muffler inlet and defining at least a portion of the first exhaust flow path. The primary valve is disposed in the primary exhaust conduit. The snowmobile further includes a secondary valve selectively controlling the flow of exhaust gas flowing through the second exhaust flow path.

In some implementations, the snowmobile further has a secondary exhaust conduit fluidly connecting the turbocharger to the second muffler inlet and defining at least a portion of the second exhaust flow path, and the secondary valve is disposed in the secondary exhaust conduit.

In some implementations, the secondary valve is open below a threshold atmospheric pressure.

In some implementations, the turbocharger has a housing, the valve is a primary valve, and the snowmobile further includes a primary exhaust conduit fluidly connecting the first pipe outlet to the first muffler inlet and defining at least a portion of the first exhaust flow path, the primary valve being disposed in the housing of the turbocharger, and a secondary valve selectively controlling the flow of exhaust gas flowing through the second exhaust flow path.

In some implementations, the snowmobile further includes a secondary exhaust conduit fluidly connecting the turbocharger to the second muffler inlet and defining at least a portion of the second exhaust flow path, and the secondary valve is disposed in the secondary exhaust conduit.

In some implementations, the secondary valve is open below a threshold atmospheric pressure.

In some implementations, the snowmobile further includes a secondary exhaust conduit fluidly connecting the turbocharger to the second muffler inlet and defining at least a portion of the second exhaust flow path, and a transfer conduit fluidly connecting the primary and secondary exhaust conduits. The transfer conduit is positioned downstream from the primary valve and upstream from the secondary valve.

In some implementations, one of the first and second exhaust flow paths extends from another one of the first and second exhaust flow paths, and the valve is an inverted valve that is movable for simultaneously controlling the flow of exhaust gas flowing through the first and second exhaust flow paths.

In some implementations, the snowmobile further includes a handlebar connected to the frame. The engine air inlet is forward of the handlebar.

In implementations of the present technology, the exhaust system has an exhaust pipe that has first and second pipe outlets. The exhaust system further has a muffler having first and second muffler inlets and a muffler outlet. Each pipe outlet defines the beginning of a respective exhaust flow path. The first exhaust flow path is defined from the first pipe outlet to the first muffler inlet, and the second exhaust flow path is defined from the second pipe outlet to the second muffler inlet. A turbocharger is fluidly connected along the second exhaust flow path between the second pipe outlet and the second muffler inlet. A valve is disposed between the pipe and the first muffler inlet for selectively controlling the flow of exhaust gas flowing through the first exhaust flow path.

By controlling the flow of exhaust gas through the first and/or second exhaust flow path, the engine can be operated as a naturally aspirated engine under certain circumstances and as a turbocharged engine under other circumstances. The control of the flow of exhaust gas through the first and second exhaust flow paths may further assist in reducing backpressure issues in the exhaust system. Different implementations of the exhaust system are contemplated.

According to yet another aspect of the present technology, there is provided a method for controlling a flow of exhaust gas from an engine. The method involves moving a valve to a first position such that exhaust gas flows sequentially from the engine to a pipe, a first exhaust flow path, a muffler and atmosphere, and further involves moving the valve to a second position such that exhaust gas flows sequentially from the engine to the pipe, a second exhaust flow path, the muffler and to the atmosphere, a turbine being disposed along the second exhaust flow path.

In some implementations, the valve is moved from the first position to the second position when the engine is operated above a threshold operating condition.

In some implementations, when the valve is in the first position, exhaust gas flowing in the first exhaust flow path has a first amount of backpressure, and when the valve is in the second position, exhaust gas flowing in the second exhaust flow path has a second amount of backpressure. The second amount of backpressure is less than the first amount of backpressure.

In some implementations, when the valve is in the first position, exhaust gas flows through a first number of expansion chambers of the muffler, and when the valve is in the second position, exhaust gas flows through a single expansion chamber of the muffler, or a second number of expansion chambers of the muffler. The second number is less than the first number.

In some implementations, the valve is a primary valve, and the method further includes selectively closing a secondary valve to close the second exhaust flow path.

In some implementations, the secondary valve is closed when the engine is operated below a threshold atmospheric pressure.

In some implementations, the method further includes selectively moving the primary and secondary valves such that exhaust gas flows from the first exhaust flow path to the second exhaust flow path.

For purposes of this application, terms related to spatial orientation such as forwardly, rearward, upwardly, downwardly, left, and right, are as they would normally be understood by a driver of the snowmobile sitting thereon in a normal riding position. Terms related to spatial orientation when describing or referring to components or sub-assemblies of the snowmobile, separately from the snowmobile, such as a heat exchanger for example, should be understood as they would be understood when these components or sub-assemblies are mounted to the snowmobile, unless specified otherwise in this application.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein. The explanations provided above regarding the above terms take precedence over explanations of these terms that may be found in any one of the documents incorporated herein by reference.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
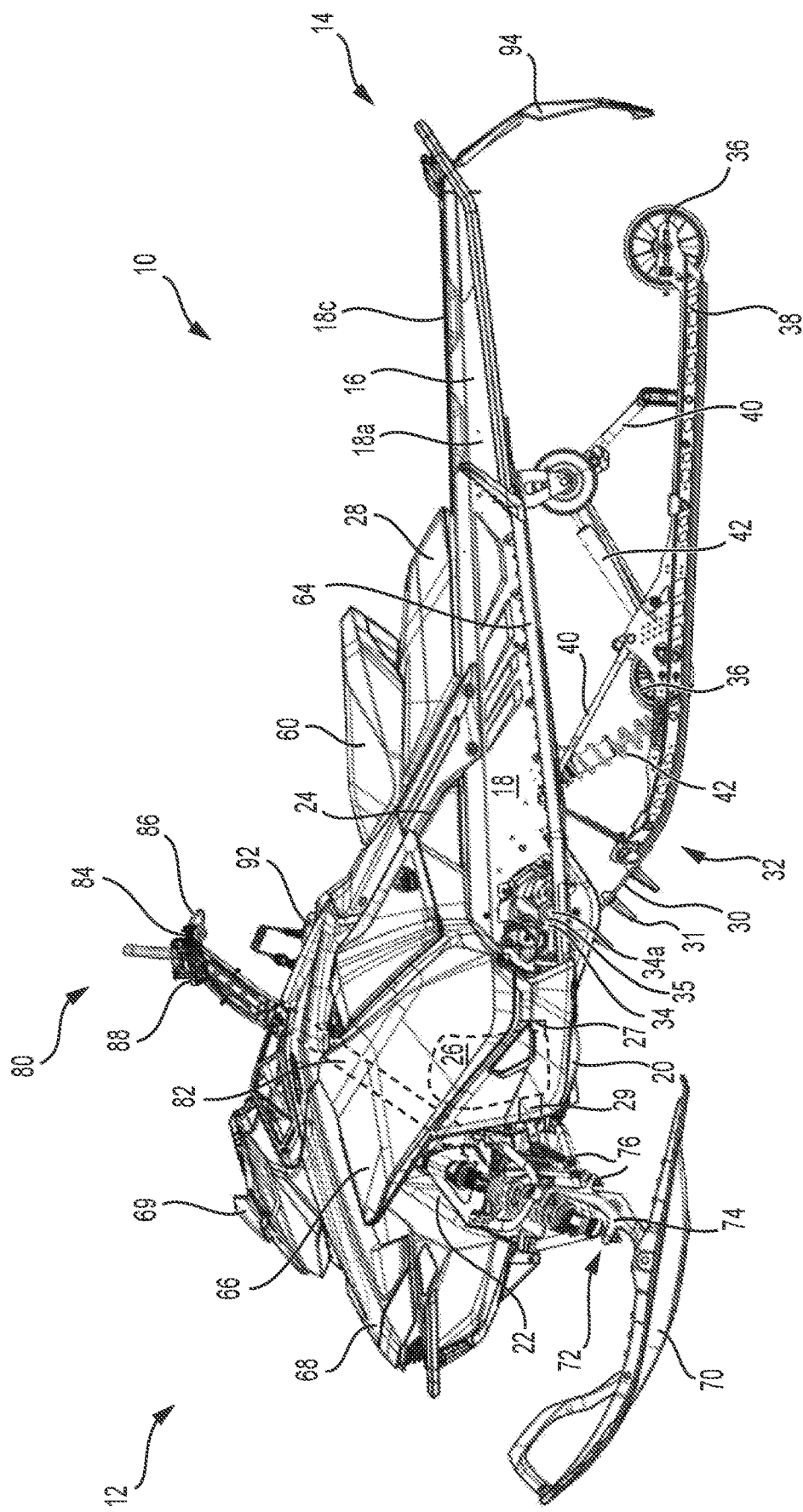
FIG. 1 is a left side elevation view of a snowmobile, with a portion of a drive track represented.
Figure 2:
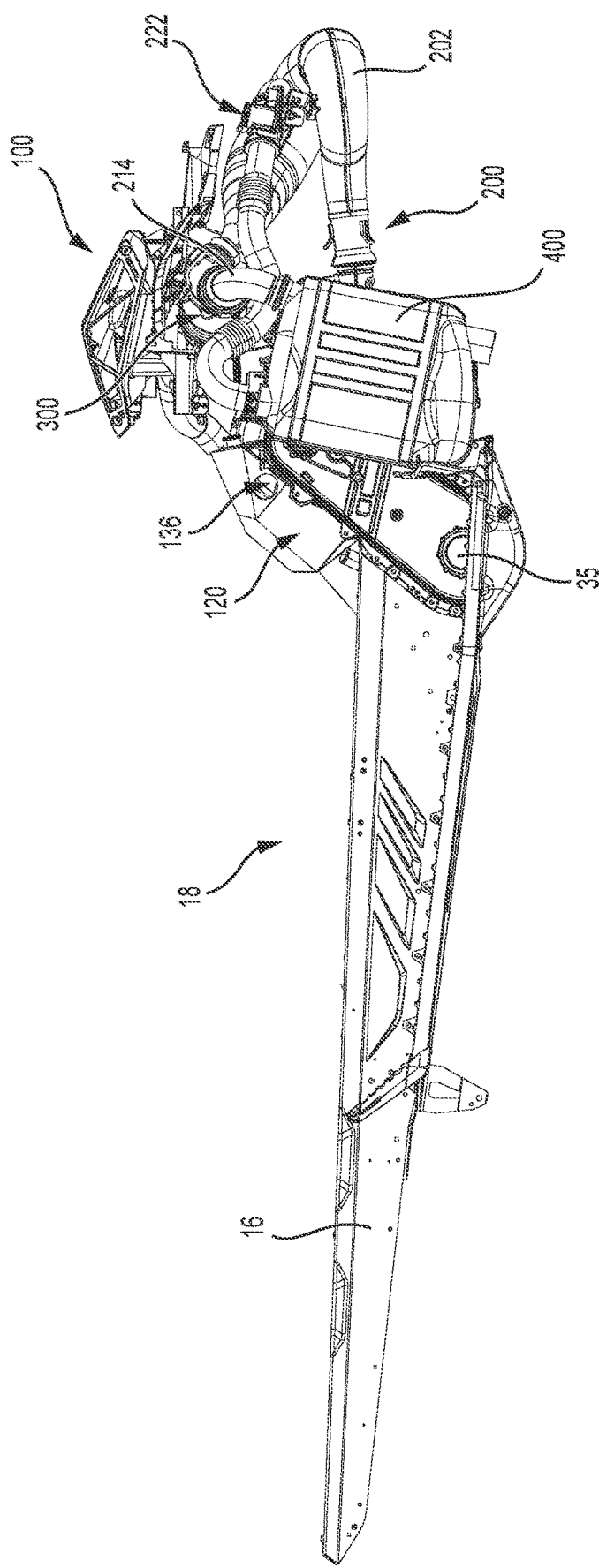
FIG. 2 is a right side elevation view of a portion of the snowmobile of FIG. 1 showing a tunnel, an air intake system, and an exhaust system according to a first implementation.

With reference to FIG. 1, a snowmobile 10 includes a forward end 12 and a rearward end 14. The snowmobile 10 includes a vehicle body in the form of a frame or chassis 16 which, as can be seen in FIG. 2, includes a tunnel 18, an engine cradle portion 20, a front suspension module 22 and an upper structure 24.

Figure 3:
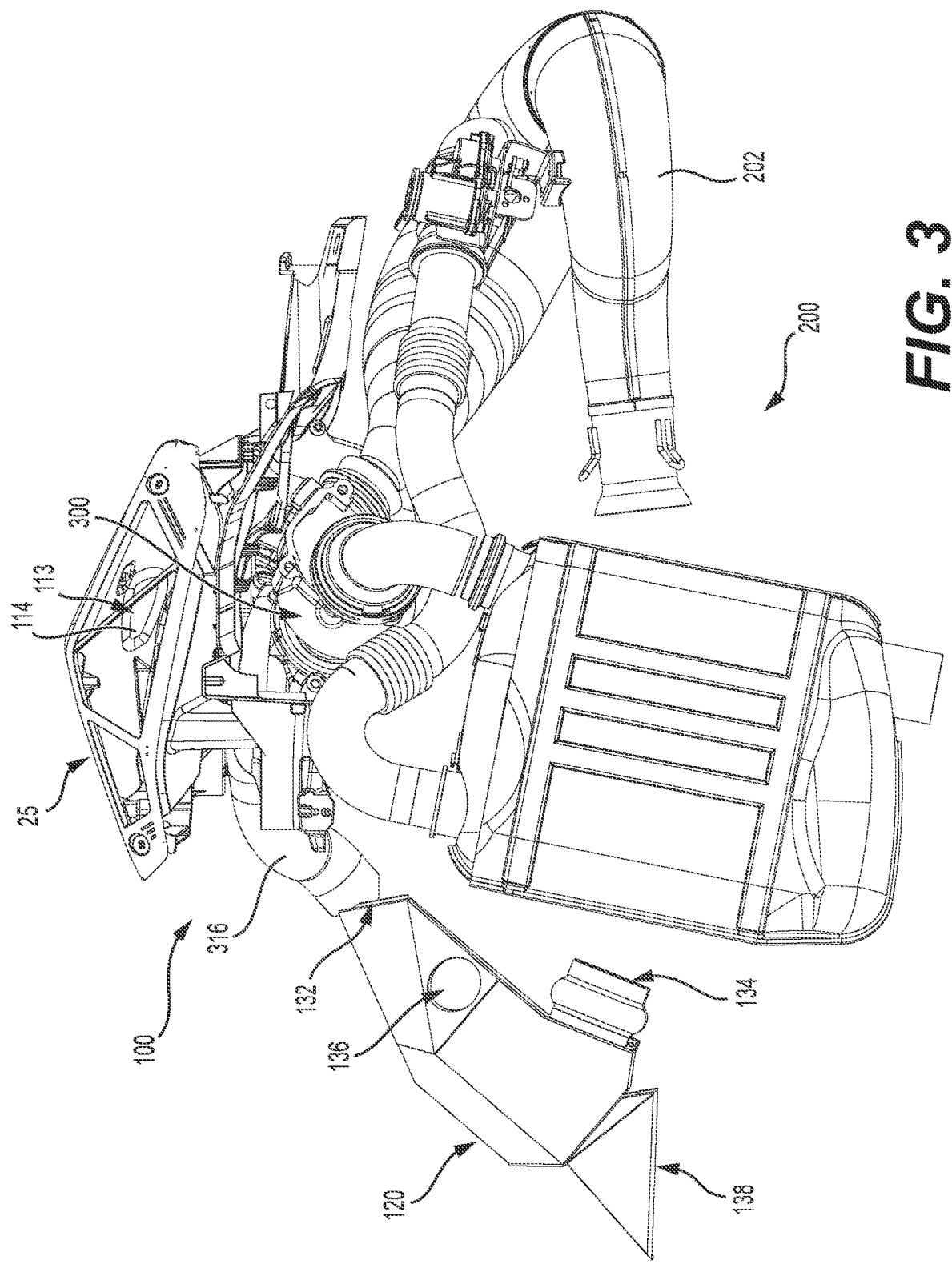
FIG. 3 is a right side elevation view of the air intake system and the exhaust system of FIG. 2.
Figure 4:
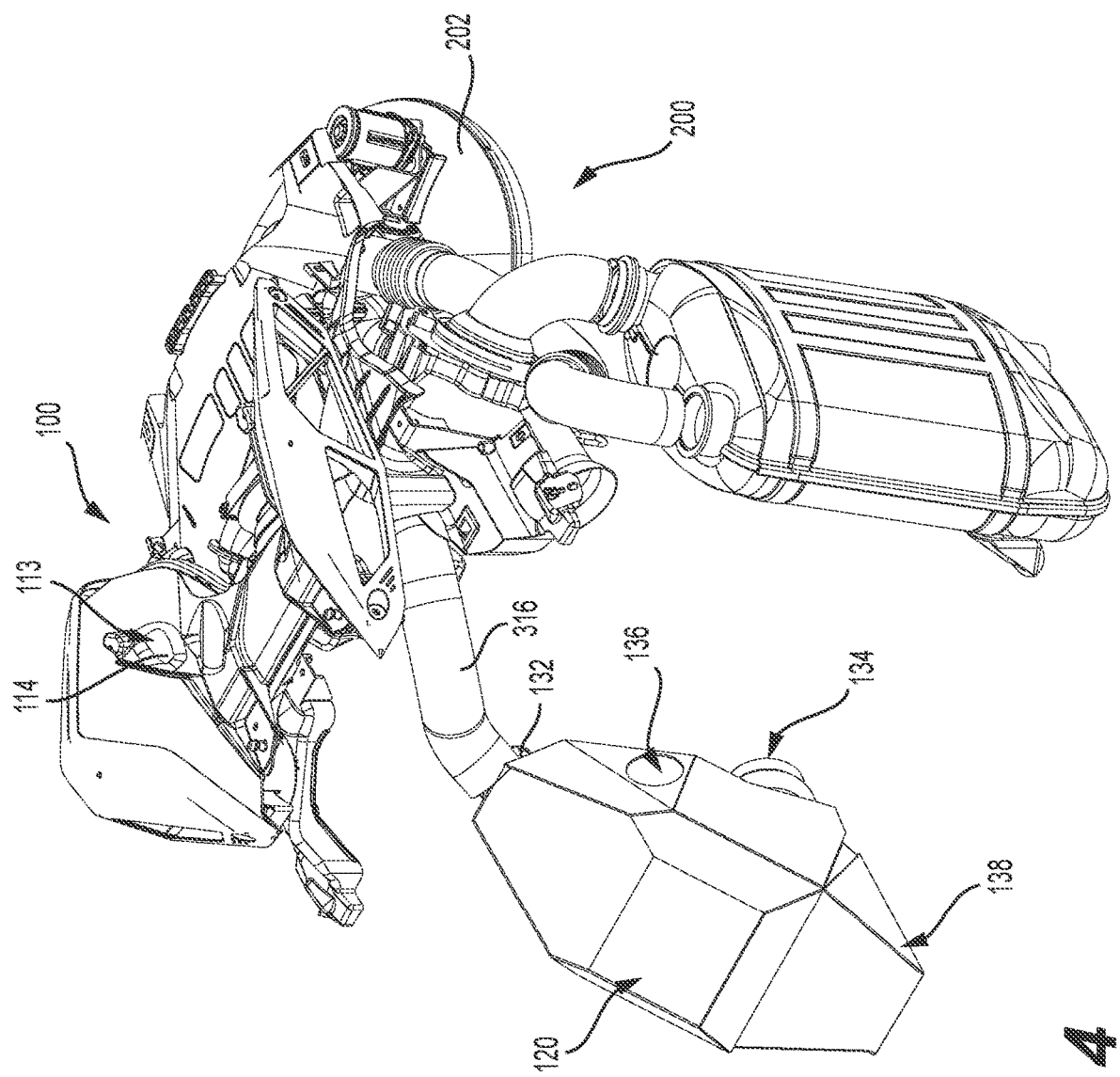
FIG. 4 is a perspective view taken from a top, rear, right side of the air intake system and the exhaust system of FIG. 3.
Figure 5:
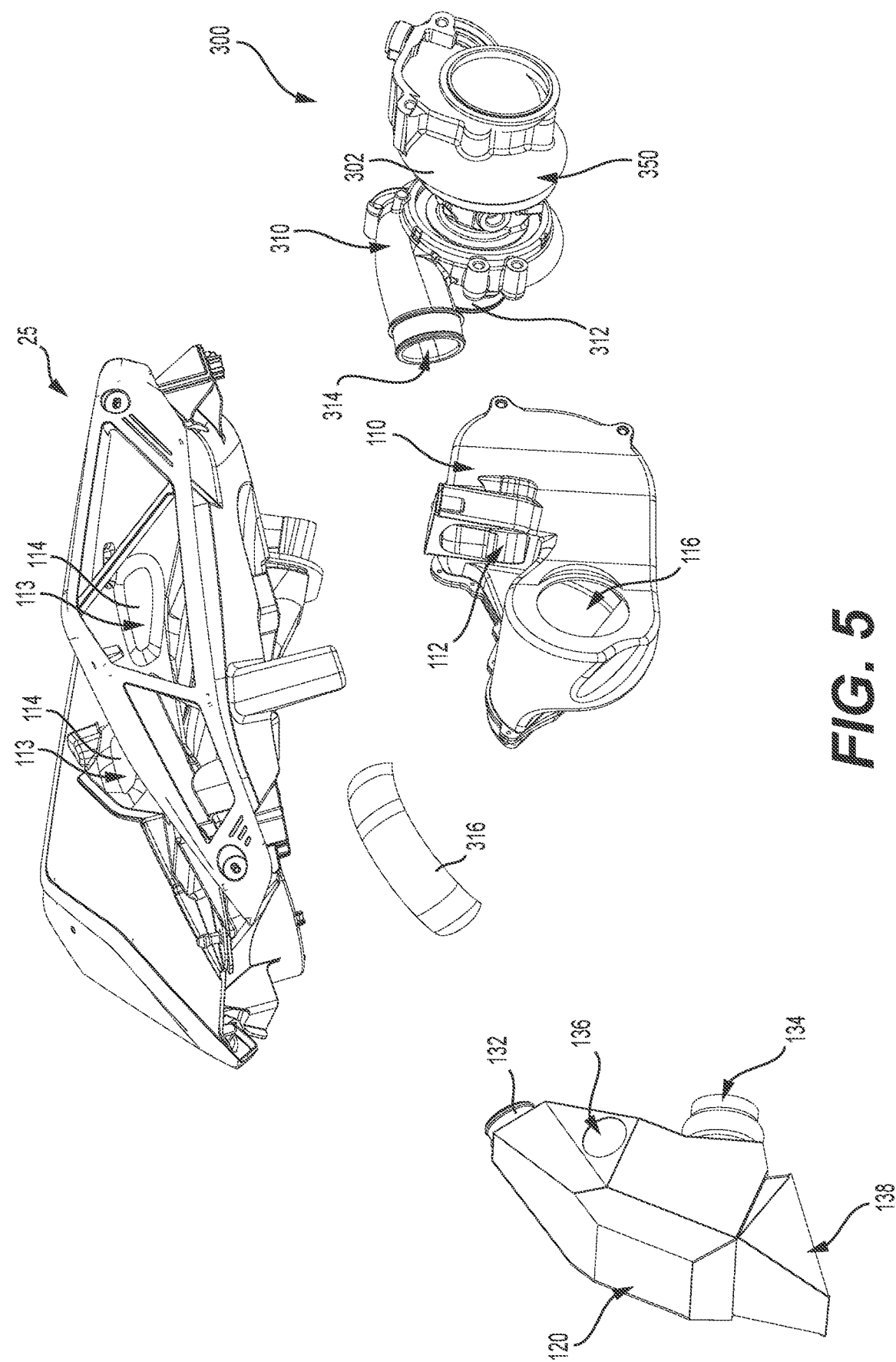
FIG. 5 is a perspective exploded view of the air intake system of FIG. 3.
Figure 8:
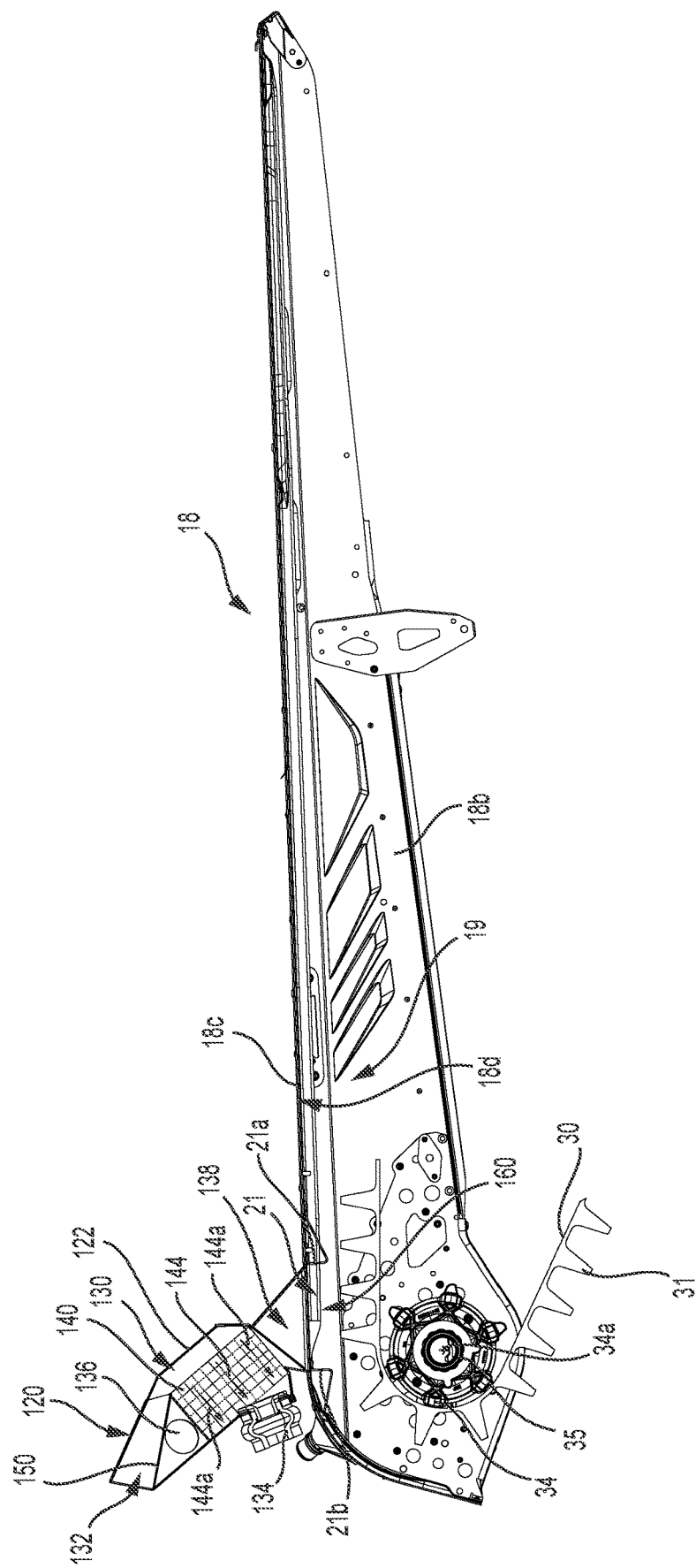
FIG. 8 is a cross-sectional view of the tunnel and the primary airbox of FIG. 6, taken along cross-section line 8-8 of FIG. 6, with a portion of the drive track represented.
Figure 9:
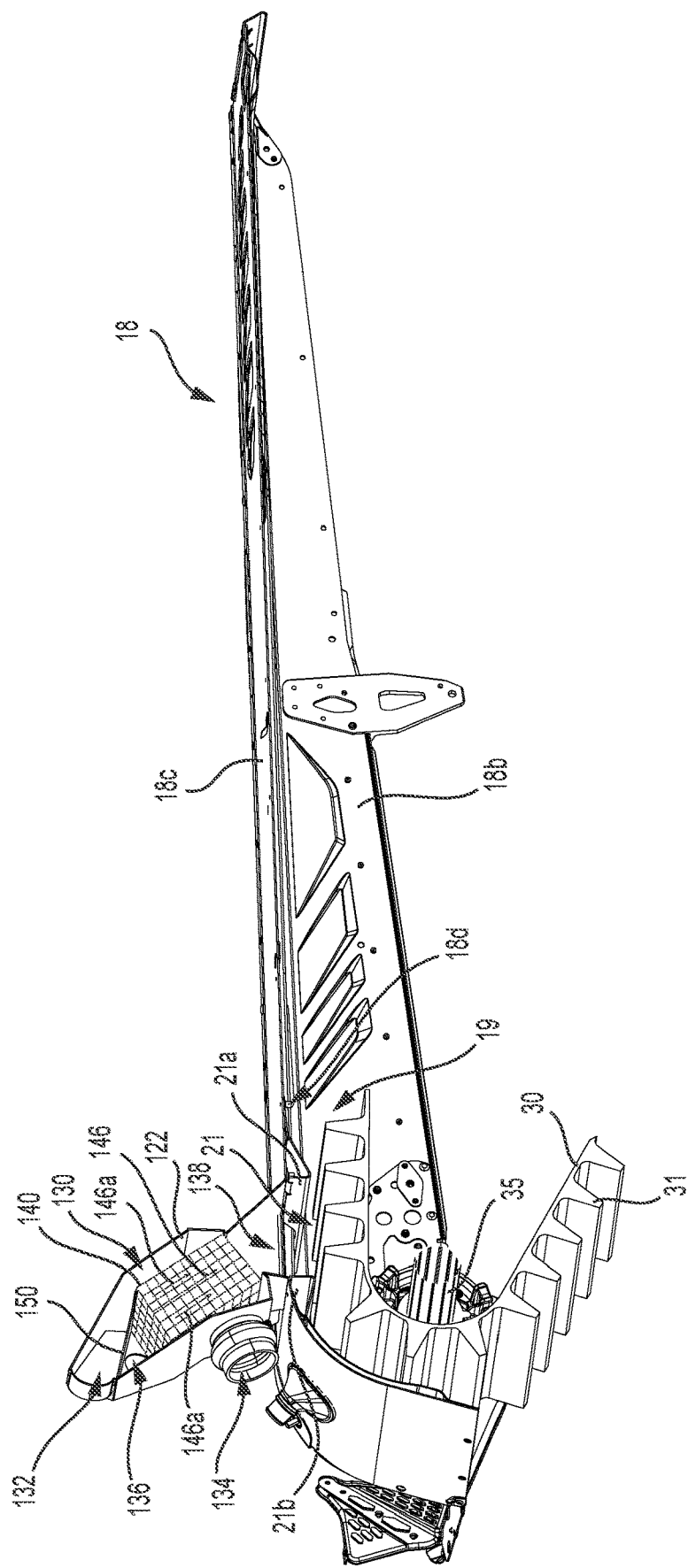
FIG. 9 is a perspective view taken from a front, left side of the cross-section taken along cross-section line 9-9 of FIG. 6.

An internal combustion engine 26 (schematically illustrated in FIG. 1) is carried in an engine compartment defined in part by the engine cradle portion 20 of the frame 16. A fuel tank 28, supported above the tunnel 18, supplies fuel to the engine 26 for its operation. The engine 26 receives air from an air intake system 100 (FIGS. 2 and 3) that includes a heat exchanger 130 (FIGS. 8 and 9). Air flowing into the engine 26 is first cooled by circulating through the heat exchanger 130 as will be described in greater detail below.

An endless drive track 30 is positioned at the rear end 14 of the snowmobile 10. The drive track 30 is disposed generally under the tunnel 18, and is operatively connected to the engine 26 through a belt transmission system and a reduction drive. The endless drive track 30 is driven to run about a rear suspension assembly 32 operatively connected to the tunnel 18 for propulsion of the snowmobile 10. The endless drive track 30 has a plurality of lugs 31 extending from an outer surface thereof to provide traction to the track 30.

The rear suspension assembly 32 includes drive sprockets 34, idler wheels 36 and a pair of slide rails 38 in sliding contact with the endless drive track 30. The drive sprockets 34 are mounted on an axle 35 and define a sprocket axis 34a. The axle 35 is operatively connected to a crankshaft (not shown) of the engine 26. The slide rails 38 are attached to the tunnel 18 by front and rear suspension arms 40 and shock absorbers 42. It is contemplated that the snowmobile 10 could be provided with a different implementation of a rear suspension assembly 32 than the one shown herein.

A straddle-type seat 60 is positioned atop the fuel tank 28. A fuel tank filler opening covered by a cap 92 is disposed on the upper surface of the fuel tank 28 in front of the seat 60. It is contemplated that the fuel tank filler opening could be disposed elsewhere on the fuel tank 28. The seat 60 is adapted to accommodate a driver of the snowmobile 10. The seat 60 could also be configured to accommodate a passenger. A footrest 64 is positioned on each side of the snowmobile 10 below the seat 60 to accommodate the driver's feet.

At the front end 12 of the snowmobile 10, fairings 66 enclose the engine 26 and the belt transmission system, thereby providing an external shell that not only protects the engine 26 and the transmission system, but can also make the snowmobile 10 more aesthetically pleasing. The fairings 66 include a hood 68 and one or more side panels which can be opened to allow access to the engine 26 and the belt transmission system when this is required, for example, for inspection or maintenance of the engine 26 and/or the transmission system. A windshield 69 connected to the fairings 66 acts as a wind screen to lessen the force of the air on the rider while the snowmobile 10 is moving.

Two skis 70 positioned at the forward end 12 of the snowmobile 10 are attached to the front suspension module 22 of the frame 16 through a front suspension assembly 72. The front suspension module 22 is connected to the front end of the engine cradle portion 20. The front suspension assembly 72 includes ski legs 74, supporting arms 76 and ball joints (not shown) for operatively connecting to the respective ski leg 74, supporting arms 76 and a steering column 82 (schematically illustrated in FIG. 1).

A steering assembly 80, including the steering column 82 and a handlebar 84, is provided generally forward of the seat 60. The steering column 82 is rotatably connected to the frame 16. The lower end of the steering column 82 is connected to the ski legs 74 via steering rods (not shown). The handlebar 84 is attached to the upper end of the steering column 82. The handlebar 84 is positioned in front of the seat 60. The handlebar 84 is used to rotate the steering column 82, and thereby the skis 70, in order to steer the snowmobile 10. A throttle operator 86 in the form of a thumb-actuated throttle lever is mounted to the right side of the handlebar 84. Other types of throttle operators, such as a finger-actuated throttle lever and a twist grip, are also contemplated. A brake actuator 88, in the form of a hand brake lever, is provided on the left side of the handlebar 84 for braking the snowmobile 10 in a known manner. It is contemplated that the windshield 69 could be connected directly to the handlebar 84. Engine air inlets 27 are forward of the handlebar 84.

At the rear end of the snowmobile 10, a snow flap 94 extends downward from the rear end of the tunnel 18. The snow flap 94 protects against dirt and snow that can be projected upward from the drive track 30 when the snowmobile 10 is being propelled by the moving drive track 30. It is contemplated that the snow flap 94 could be omitted.

The snowmobile 10 includes other components such as a display cluster, and the like. As it is believed that these components would be readily recognized by one of ordinary skill in the art, further explanation and description of these components will not be provided herein.

With reference to FIGS. 6 to 9, the tunnel 18 will now be described in more detail. The inverted U-shaped tunnel 18 has a left side portion 18a and a right side portion 18b. The footrests 64 are connected to the left and right side portions 18a, 18b. A top portion 18c extends between the left and right side portions 18a, 18b. The left, right and top portions 18a, 18b, 18c define a longitudinally extending space 19 therebetween. The upper portion of the drive track 30 is disposed at least partly in the space 19. The drive sprockets 34 and the axle 35 are disposed in a forward portion of the space 19 enclosed by the forward portion of the tunnel 18.

A passage 21 is defined in the top portion 18c of the tunnel 18 in the form of a through hole. As can be seen in FIG. 8, the passage 21 is above the axle 35 and is longitudinally aligned with the axle 35. A protrusion 21a is defined rearwardly of the passage 21 on a bottom face 18d of the top portion 18c. Another protrusion 21b is defined forwardly of the passage 21 on the bottom face 18d of the top portion 18c. In the present implementation, the protrusions 21a, 21b extend downwardly from the top portion 18c and are defined by a portion of the sheet metal of the top portion 18c of the tunnel 18. In some implementations, the protrusions 21a, 21b could be separate components that are connected to the bottom face 18d of the top portion 18c. The protrusions 21a, 21b extend downwardly from the top portion 18c of the tunnel 18 and above the drive track 30, as can be seen in FIGS. 8 and 9. In some implementations, both protrusions 21a, 21b or only the protrusion 21b could be omitted.

The engine 26 is an inline, two-cylinder, two-stroke, internal combustion engine. The two cylinders of the engine 26 are oriented with their cylindrical axes disposed vertically. It is contemplated that the engine 26 could be configured differently. For example, the engine 26 could have more or less than two cylinders, and the cylinders could be arranged in a V-configuration instead of in-line. It is contemplated that in some implementations the engine 26 could be a four-stroke internal combustion engine, a carbureted engine, or any other suitable engine capable of propelling the snowmobile 10.

Figure 12:
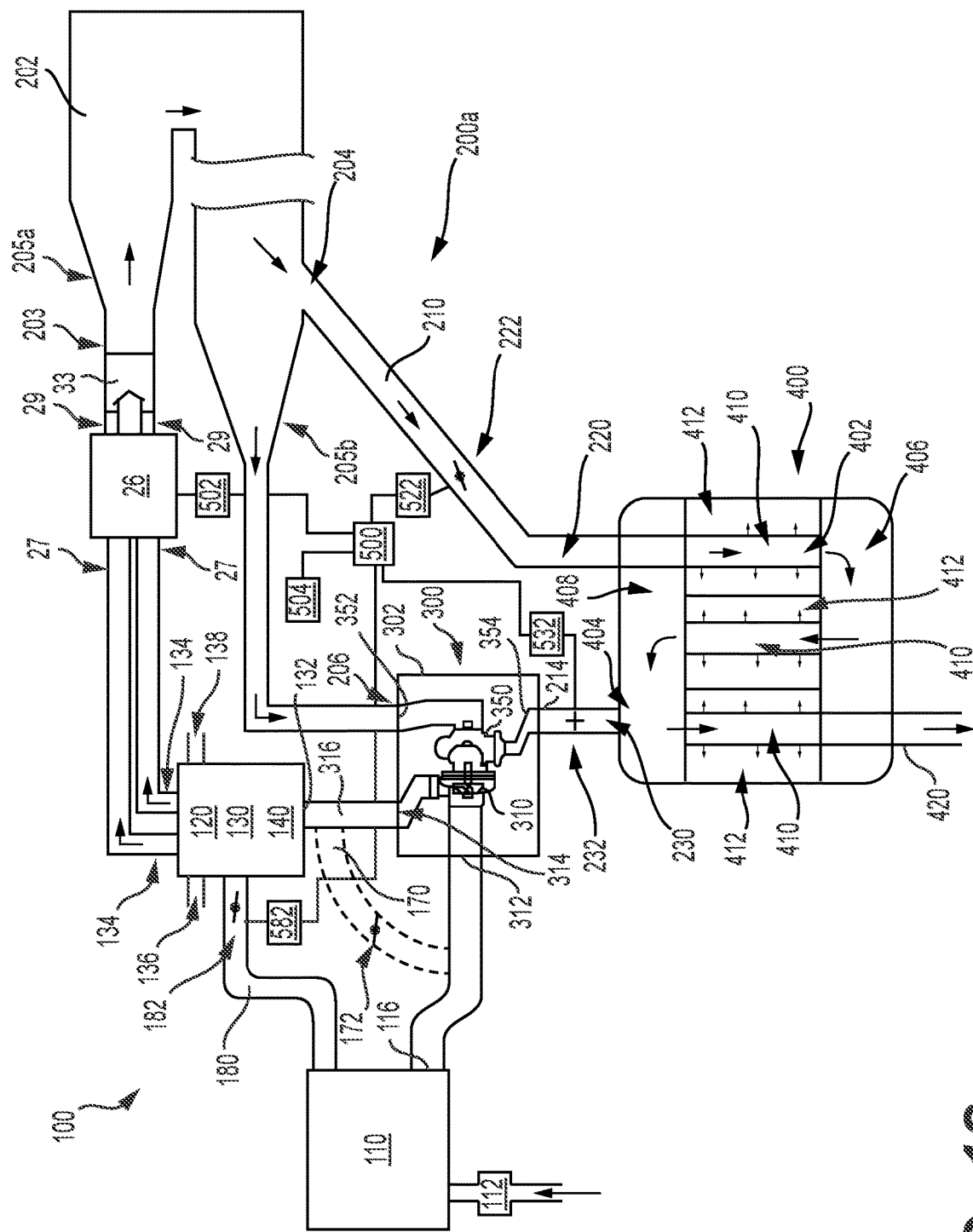
FIG. 12 is a schematic representation of the air intake system and the exhaust system of FIG. 3.
Figure 13:
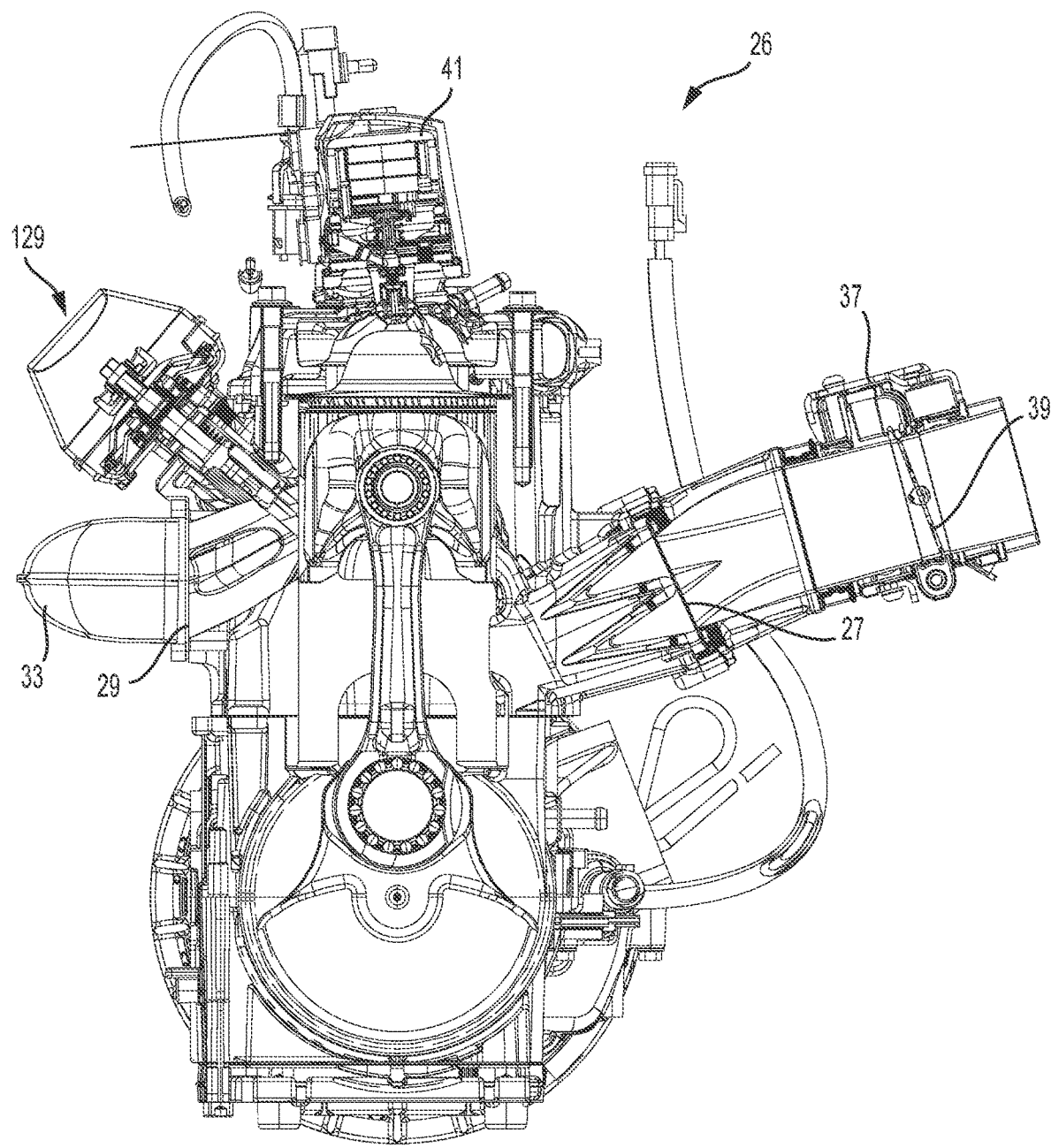
FIG. 13 is a cross-sectional view of the internal combustion engine of the snowmobile of FIG. 1.

Referring to FIGS. 12 and 13, the engine 26 receives air from the air intake system 100 via the engine air inlet 27 defined in the rear portion of each cylinder of the engine 26. Each air inlet 27 is connected to a throttle body 37 of the air intake system 100. The throttle body 37 comprises a throttle valve 39 which rotates to regulate the amount of air flowing through the throttle body 37 into the corresponding cylinder of the engine 26. A throttle valve actuator (not shown) is operatively connected to the throttle valve 39 to change the position of the throttle valve 39 and thereby adjust the opening of the throttle valve 39 with operation of the throttle lever 86 on the handlebar 84. It is also contemplated that the throttle valve actuator could be in the form of an electric motor. The electric motor could change the position of the throttle valve 39 based on input signals received from an electronic control module (not shown) which in turn receives inputs signals from a position sensor associated with the throttle lever 86 on the handlebars 84. Further details regarding such drive-by wire throttle systems can be found in International Patent Publication No. WO 2014/005130 A1, published on Jan. 3, 2014, the entirety of which is incorporated herein by reference. The air intake system 100 includes a heat exchanger 130 for cooling intake air as will be described in greater detail below.

The engine 26 receives fuel from the fuel tank 28 via injectors 41 having an opening in the cylinders. The fuel-air mixture in each of the left and right cylinders of the engine 26 is ignited by an ignition system (not shown). Engine output power, torque and engine speed are determined in part by the ignition timing, and also by various characteristics of the fuel-air mixture such as its composition, temperature, pressure and the like.

Exhaust gases resulting from the combustion events of the combustion process are expelled from the engine 26 via an exhaust system 200. An exhaust outlet 29 is defined in the front portion of each cylinder of the engine 26. The exhaust outlets 29 are fluidly connected to an exhaust manifold 33. The exhaust system 200 includes an exhaust pipe 202 which is connected to the exhaust manifold 33 and extends forwardly therefrom to direct the exhaust gases out of the engine 26. The exhaust system 200 will be described in greater detail below.

A turbocharger 300 is operatively connected to the engine 26. The turbocharger 300 has a housing 302 including an air compressor 310 and an exhaust turbine 350. The air compressor 310 includes a compressor turbine and is part of the air intake system 100. Intake air flowing past the rotating compressor turbine is compressed thereby. The rotation of the compressor turbine is powered by the exhaust turbine 350, which is in turn rotated by exhaust gases expelled from the engine 26 and being directed to flow over the blades of the exhaust turbine 350. It is contemplated that, in some implementations, the air compressor 310 could be a supercharger, in which the compressor turbine would be directly powered by the engine 26.

With reference to FIGS. 2 to 9, the air intake system 100 will be described. Air from the atmosphere flows through side apertures 113 defined in an upper portion 25 of the upper structure 24 of the chassis 16. Screens 114 connected to the upper portion 25 may assist in preventing debris, dust particles, snow and/or water to enter the side apertures 113. The air then flows through a secondary airbox 110 through an inlet 112 defined in the front portion of the snowmobile 10. The inlet 112 is defined in the upper portion 25 of the upper structure 24. Screens and/or filters may be connected to the inlet 112 of the secondary airbox 110. The secondary airbox 110 is disposed above the front suspension module 22. An outlet 116 is defined in the middle portion on the right side of the secondary airbox 110. The outlet 116 is fluidly connected to an inlet 312 of the air compressor 310 disposed on the right side of the engine 26. It is contemplated that the secondary airbox 110 could be omitted and that air from the atmosphere could directly enter into the inlet 312 without going through the secondary airbox 110.

When the air from the atmosphere is compressed by the air compressor 310, the air warms up because of the friction between the air molecules and because of the increase of pressure. In addition, when the exhaust gas flows through the exhaust turbine 350, some of the heat of the exhaust gas heats up the housing 302, which in turn transfers some of that heat to the air being compressed in the air compressor 310, warming up the compressed air even more. The compressed air then flows out of the air compressor 310 through an outlet 314, into a conduit 316 and into a primary air box 120. The secondary airbox 110 defines a first chamber of the air intake system 100, and the primary airbox 120 defines a second chamber of the air intake system 100. In some implementations, the chambers defined by the secondary airbox 110 and the primary airbox 120 act as resonators lowering the noise exiting through the air intake system 100.

Figure 6:
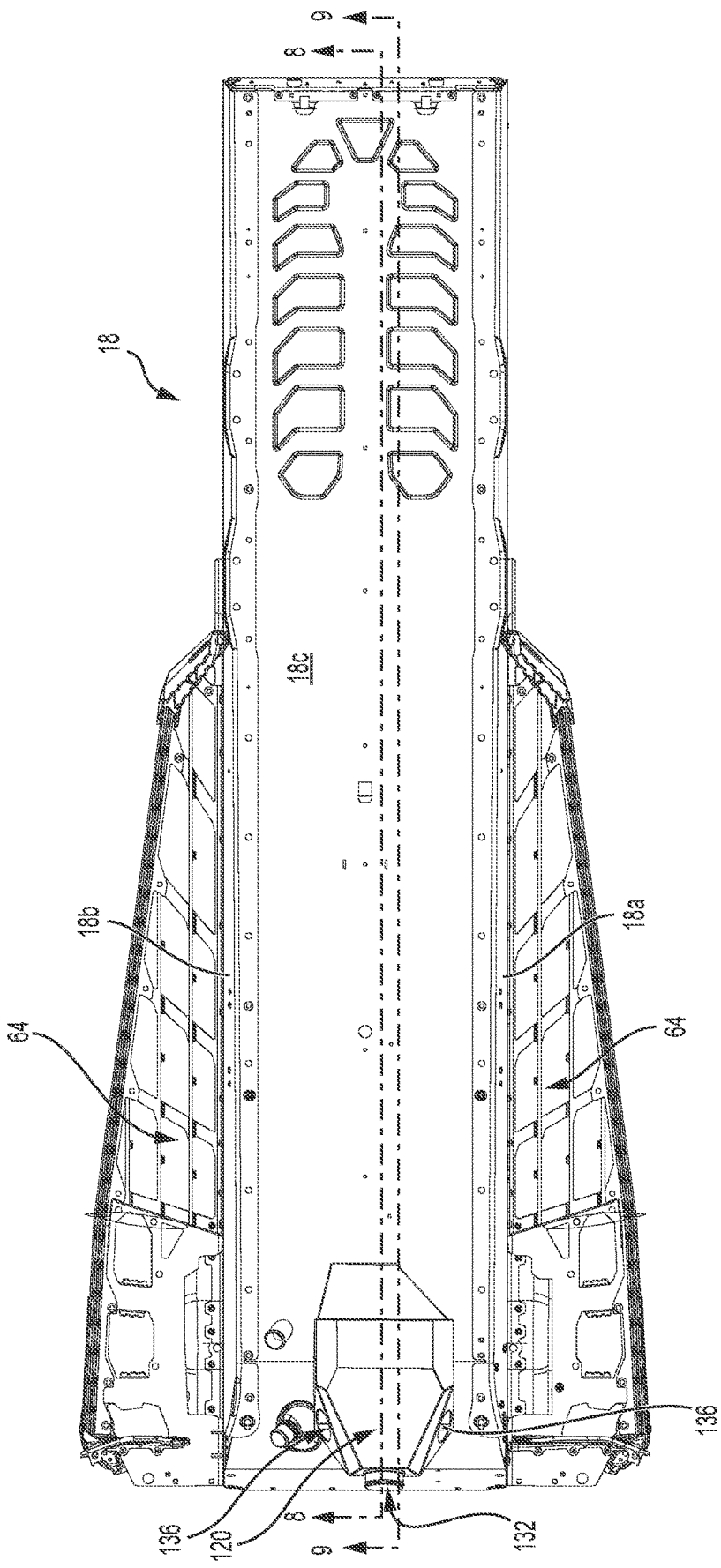
FIG. 6 is a top plan view of the tunnel of FIG. 2, with a primary airbox of the air intake system.
Figure 7:
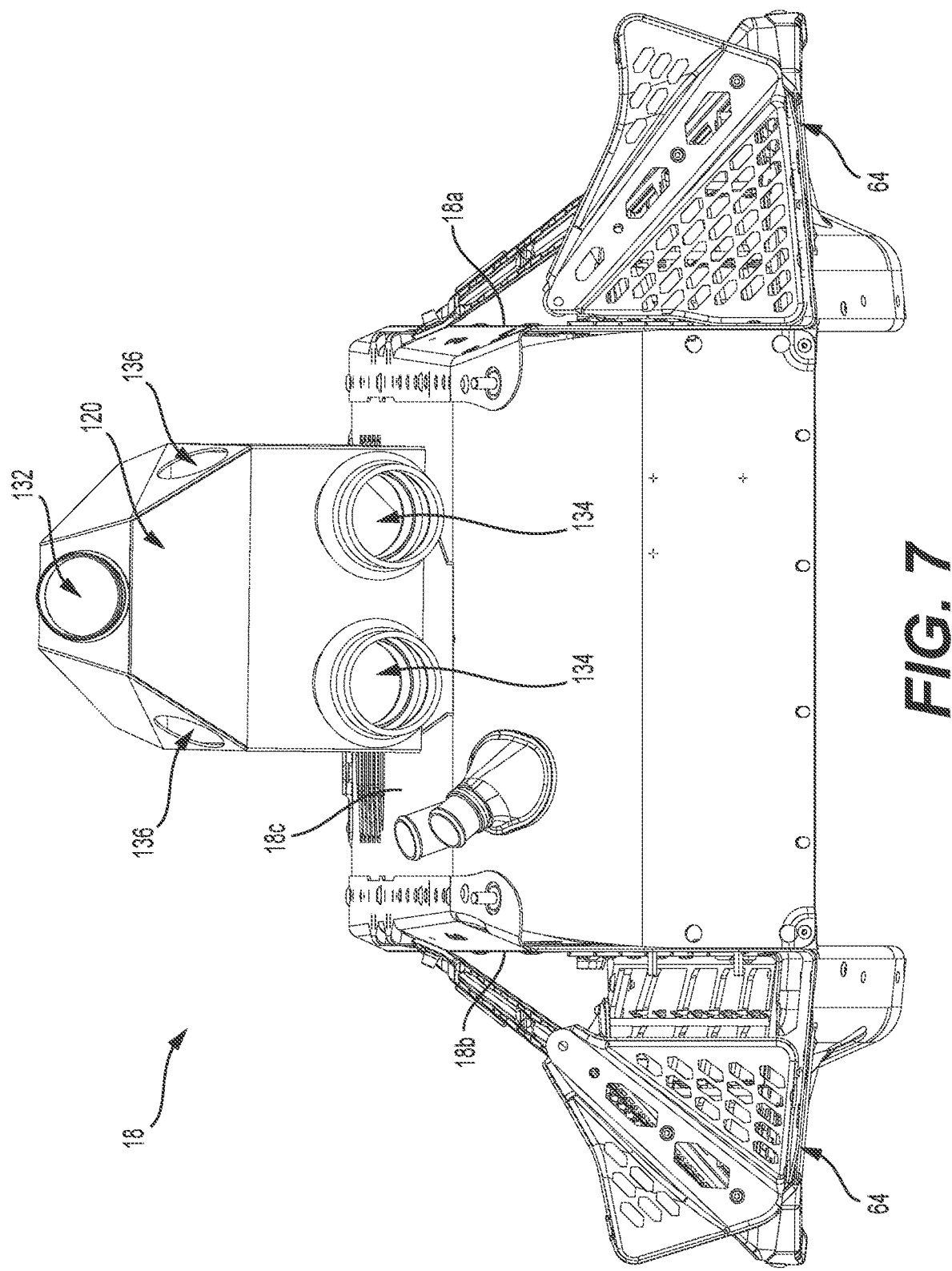
FIG. 7 is a front elevation view of the tunnel and the primary airbox of FIG. 6.

As best seen in FIGS. 6 and 7, the primary air box 120 is connected to a forward portion of the tunnel 18 on the top portion 18c thereof. The primary air box 120 is fastened to the tunnel 18, but it is contemplated that it could be connected thereto otherwise. It is also contemplated that the primary air box 120 could be connected to another portion of the snowmobile 10, instead of the tunnel 18. The primary air box 120 is a heat exchanger 130 (FIGS. 8 and 9). The heat exchanger 130 has a heat exchanger engine air inlet 132 fluidly connected to the conduit 316, two heat exchanger engine air outlets 134 fluidly connected to each engine air inlet 27, two cooling air inlets 136 for receiving air from the atmosphere, and a cooling air outlet 138 fluidly connected between the cooling air inlet 136 and the passage 21 defined in the tunnel 18. As best seen in FIGS. 6 to 9, the cooling air inlets 136 and the cooling air outlet 138 are disposed laterally between the left and right side portions 18a, 18b of the tunnel 18. In addition, the cooling air inlets 136 and the cooling air outlet 138 are disposed vertically higher than the top portion 18c of the tunnel 18. It is contemplated that the cooling air inlets 136 and the cooling air outlet 138 could be positioned otherwise.

Referring to FIGS. 8 and 9, the heat exchanger 130 includes an intercooler 140. The intercooler 140 is made of extruded metal, but it is contemplated that it could be made otherwise. The intercooler 140 defines paths 144 (FIG. 8), 146 (FIG. 9) separate from each other, each one being schematically represented by an arrow. The path 144 includes a plurality of channels 144a fluidly connecting the heat exchanger engine air inlet 132 to the heat exchanger engine air outlets 134, each one being schematically represented by an arrow. The channels 144a extend generally longitudinally with respect to the primary air box 120. The primary air box 120 further includes a baffle 150 extending above the intercooler 140 for separating the paths 144, 146. The baffle 150 directs the air entering the primary air box 120 through the heat exchanger engine air inlet 132 toward a rear wall 122 thereof. Since the paths 144, 146 are separate from each other, the air flowing from the heat exchanger engine air inlet 132 to the heat exchanger engine air outlets 134, and the air flowing from the cooling air inlets 136 to the cooling air outlet 138 do not mix. In some implementations, it is contemplated that the two paths 144, 146 could be in fluid communication and could allow for the air flowing through the intercooler 140 to mix at least partially.

The path 146 includes a plurality of channels 146a (FIG. 9) fluidly connecting the cooling air inlets 136 to the cooling air outlet 138, each one being schematically represented by an arrow. The channels 146a extend generally vertically and parallel to the rear wall 122 of the primary airbox 120. As such, the path 144 is perpendicular to the path 146. The paths 144, 146 are in thermal communication, which means that when the compressed air flows through the path 144, some of its heat is transferred to the air flowing through the path 146 via the heat exchanger 130. The air flowing through the cooling air inlets 136 and through the path 146 is air from the atmosphere and is cooler than the compressed air flowing through the path 144. It is contemplated that the air flowing through the path 146 could be, in some implementations, air from the atmosphere contained within the body of the snowmobile 10 or the engine compartment thereof. As such, the compressed air flowing from the heat exchanger engine air inlet 132 to the heat exchanger engine air outlets 134 is cooled by the air flowing from the cooling air inlets 136 to the cooling air outlet 138. In other words, as air from the atmosphere flows along the path 146, it is heated up by the heat exchanger 130 that assists in transferring some of the heat from the compressed air flowing through the path 144 to the air from the atmosphere flowing through the path 146. As a result, the compressed air flowing through the heat exchanger engine air outlets 134 is cooler than the compressed air flowing through the heat exchanger engine air inlet 132, and provides for a denser intake charge for the engine 26.

As will be described with reference with FIGS. 8 and 9, the passage 21 defined in the top portion 18c of the tunnel 18 further assists in cooling the compressed air flowing through the passage 144. When the snowmobile 10 is being propelled, the drive track 30 is rotating inside the space 19 of the tunnel 18. Rotation of the drive track 30, and of the lugs 31 extending therefrom, creates a low pressure zone 160 near the passage 21. The low pressure zone 160 is understood to be a zone near the passage 21 having a pressure that is lower than the atmospheric pressure. The decrease of atmospheric pressure within the low pressure zone 160 is caused by the rotation of the drive track 30 when the snowmobile 10 is propelled forwardly. As such, when the drive track 30 propels the snowmobile 10 forwards, the lugs 31 have an effect similar to that of the blades of a fan, in that the lugs 31 move the air near or within the passage 21 forwardly therefrom, and thus locally decreasing the air pressure. In addition, the protrusion 21a has a venturi-like effect and breaks the boundary layer of the air flowing between bottom face 18d of the tunnel 18 and the drive track 30 and causes turbulent flow of the air forward of the protrusion 21a and within the passage 21. As a result, the low pressure zone 160 is forward of the protrusion 21a and at least partially rearward of the protrusion 21b.

When the low pressure zone 160 is formed, air from the atmosphere is induced to flow into the heat exchanger 130 through the cooling air inlets 136, through the intercooler 140 through the path 146, through the cooling air outlet 138 and into the passage 21. As such, the efficiency of the heat exchanger 130 is increased when the snowmobile 10 is being propelled since more heat can be transferred from the air flowing through the path 144 to the air flowing through the path 146 as air from the atmosphere is induced to flow through the path 146.

Referring to FIG. 12, other components of the air intake system 100 will be described. A blow-off conduit 170 having a blow-off valve 172 is fluidly connected between the secondary airbox 120 and the primary airbox 130. The blow-off valve 172 is open under certain circumstances, such as when the compressed air exiting the outlet 314 has a pressure that is above a predetermined pressure threshold. For example, in situations where the air compressor 310 is operated and the throttle valve 39 is closed, the air compressor 310 has to spool down and the blow-off valve 172 opens to release the excess pressure. The air intake system 100 further includes a bypass conduit 180 (FIG. 12) fluidly connecting the secondary airbox 110 to the primary airbox 120. The bypass conduit 180 is thus fluidly connected between the engine air inlets 27 and the secondary airbox 120, which is positioned upstream of the air compressor 350. Air flowing through the bypass conduit 180 flows through the path 144, i.e. the air flows through the heat exchanger engine air inlet 132, is cooled by the intercooler 140, flows through the heat exchanger engine air outlets 134, and flows to the engine air inlets 27. As such, the bypass conduit 180 allows air from the atmosphere to bypass the air compressor 310 when the snowmobile 10 is ridden on a terrain having an altitude near sea level and/or under certain circumstances which will be described in more detail below. A bypass valve 182 selectively controls a flow of air flowing through the bypass conduit 180. The bypass valve 182 is open when the turbocharger 300 is not operating. It is contemplated that the bypass valve 182 could also open when the engine 26 is operated below a threshold operating condition that could be, for example, a threshold engine speed, or when the engine 26 is operated at idle.

Figure 10:
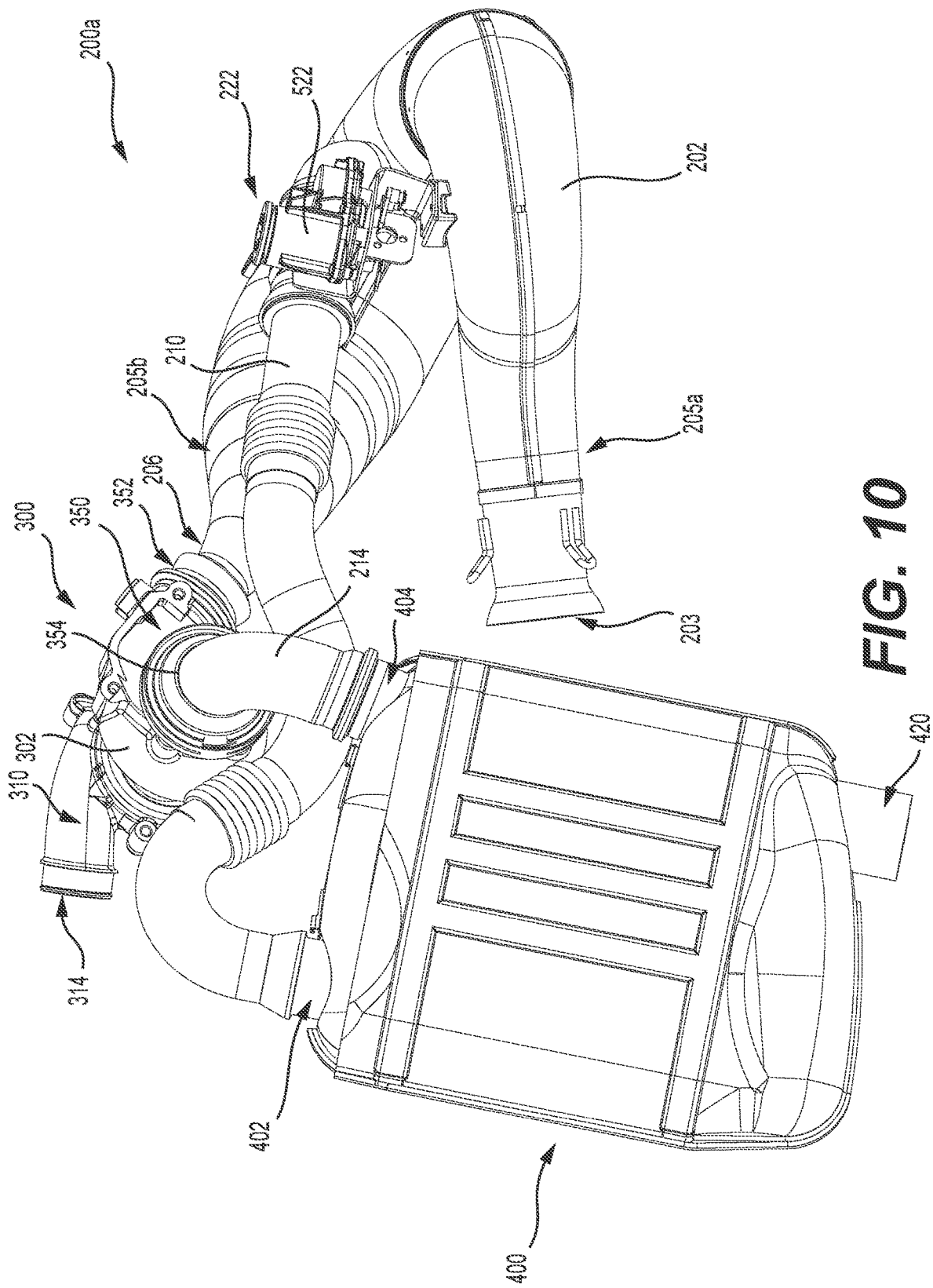
FIG. 10 is a right side elevation view of the exhaust system of FIG. 2.
Figure 11:
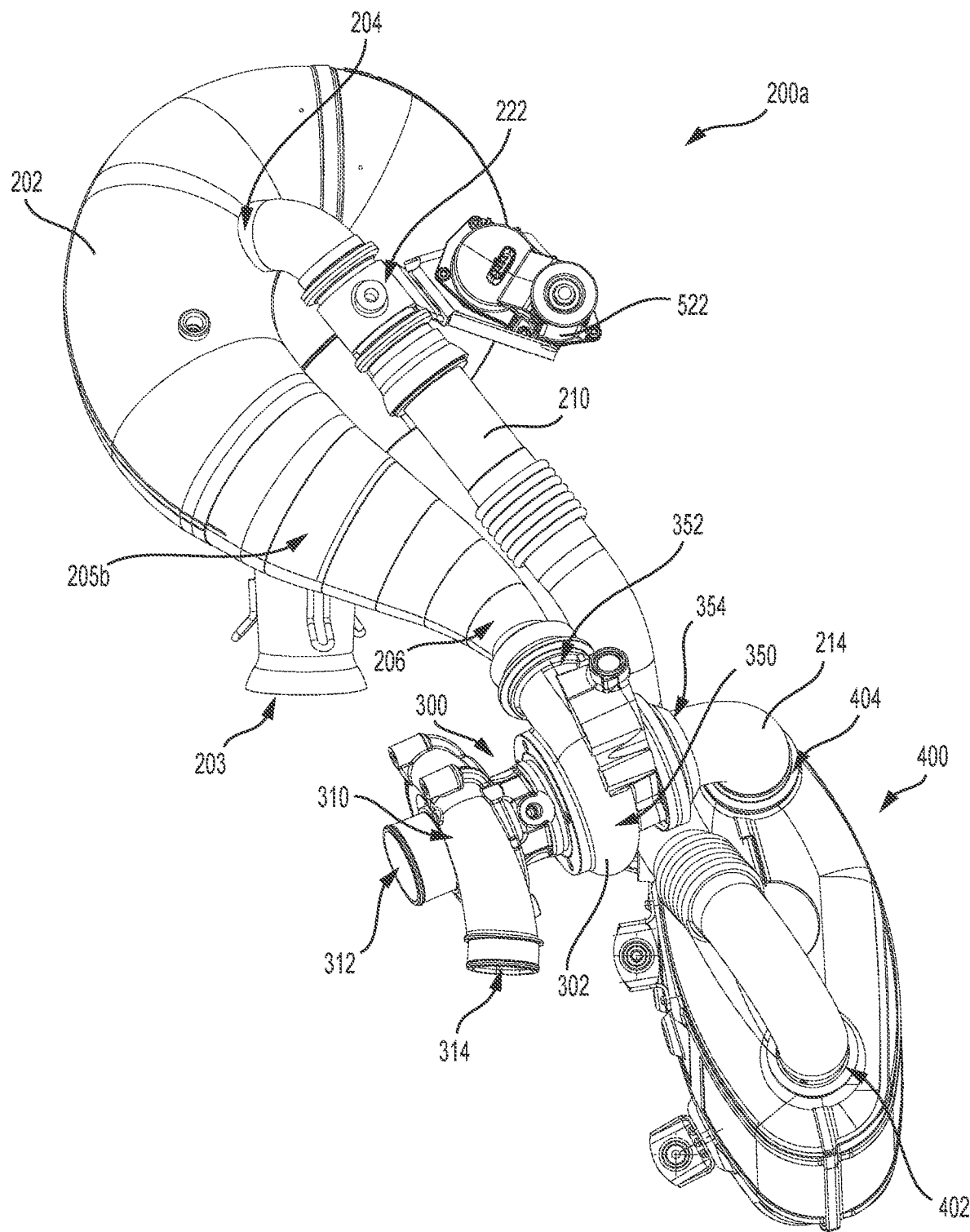
FIG. 11 is a top plan view of the exhaust system of FIG. 10.

Referring to FIGS. 10 to 12, a first implementation 200a of the exhaust system 200 will be described. The exhaust gas expelled from the engine 26 flows through the exhaust outlets 29 and into the exhaust pipe 202. As best seen in FIG. 11, the exhaust pipe 202 is curved and has a varying diameter along its length and is typically referred to as a tuned pipe. Other types of exhaust pipes 202 are contemplated. The pipe 202 includes a pipe inlet 203 fluidly connected to the exhaust manifold 33, a pipe outlet 204 located in a middle portion of the pipe 202, and a pipe outlet 206 located at the end of the pipe 202. The pipe 202 further has a divergent portion 205a adjacent to the pipe inlet 203, and a convergent portion 205b adjacent the pipe outlet 206. The pipe outlet 204 is positioned upstream from the convergent portion 205b. The pipe outlet 206 is positioned downstream from the convergent portion 205b.

The exhaust turbine 350 is connected to the exhaust system 200a for operating the air compressor 310. The exhaust turbine 350 includes an exhaust gas inlet 352 fluidly connected to the pipe outlet 206 for receiving the exhaust gas from the exhaust pipe 202. The exhaust turbine 350 further includes an exhaust gas outlet 354 connected to a muffler 400. The exhaust gas then flows through the muffler 400 into the atmosphere via a muffler outlet 420. As best seen in FIGS. 10 and 12, the muffler 400 has a muffler inlet 402, a muffler inlet 404, an expansion chamber 406 and an expansion chamber 408. A series of conduits 410 extend between the expansion chambers 406, 408. For clarity, only one of the conduits 410 fluidly connects the expansion chambers 406, 408, but it is contemplated that a plurality of conduits 410 could fluidly connect the expansion chambers 406, 408. In some implementations, there could be more than the two expansion chambers 406, 408 in the muffler 400 and the conduits 410 could fluidly connect them. The conduits 410 extend in expansion chambers 412 defined between the chambers 406, 408. The conduits 410 have through holes defined therein, and the expansion chambers 412 include sound-absorbing materials to further muffle the acoustic wave caused by the flow of the exhaust gas schematically shown by arrows in FIG. 12. In some implementations, the expansion chambers 406, 408 could include a series of baffles in order to further muffle the acoustic wave caused by the flow of the exhaust gas flowing through the muffler 400. The muffler inlet 402 is defined in the expansion chamber 406 at the end of one of the conduits 410 that is fluidly connected to the primary exhaust conduit 210. The muffler inlet 404 is defined in the expansion chamber 408 and is fluidly connected to the secondary exhaust conduit 214. The muffler outlet 420 is defined on the bottom of the muffler 400 at the end of one of the conduits 410.

Still referring to FIGS. 10 to 12, a primary exhaust conduit 210 fluidly connects the pipe outlet 204 to the muffler inlet 402, and defines at least a portion of an exhaust flow path 220. The exhaust flow path 220 extends from the pipe outlet 204 to the muffler inlet 402. A primary valve 222 is disposed in the primary exhaust conduit 210. The primary valve 222 selectively controls the flow of exhaust gas flowing through the exhaust flow path 220. When the primary valve 222 is open, the exhaust gas flowing through the exhaust flow path 220 flows in the primary exhaust conduit 210, through one of the conduits 410, through the muffler inlet 402 into the expansion chamber 406, then into the expansion chamber 408 through the conduits 410, then through the muffler outlet 420 and to the atmosphere, as schematically shown by the arrows in FIG. 12. When the exhaust gas flows through the exhaust flow path 220, the muffler 400 reduces the noise emitted by the engine 26 and/or the exhaust gas flowing to the atmosphere since the exhaust gas flows through the expansion chamber 406, the conduits 410 and the chambers 412, and the expansion chamber 408 before flowing to the atmosphere.

A secondary exhaust conduit 214 fluidly connects the exhaust gas outlet 354 of the exhaust turbine 350 to the muffler inlet 404, and defines at least a portion of an exhaust flow path 230. The exhaust flow path 230 extends from the pipe outlet 206 to the muffler inlet 404. The exhaust turbine 350 is thus fluidly connected along the exhaust flow path 230 between the pipe outlet 206 and the muffler inlet 404. A secondary valve 232 is disposed in the secondary exhaust conduit 214 (FIG. 12). The secondary valve 232 selectively controls the flow of exhaust gas flowing through the exhaust flow path 230.

Referring to FIG. 12, when the secondary valve 232 is open, the exhaust flow path 230 defines a more direct flow path from the exhaust pipe 202 than the exhaust flow path 220 since the exhaust gas avoids flowing through the expansion chamber 406 and the plurality of conduits 410. Instead, the exhaust gas flows through the muffler inlet 404 into the expansion chamber 408, and then through one of the conduits 410 and on to the atmosphere through the muffler outlet 420. In this respect and as can be seen in FIGS. 10 and 12, the secondary exhaust conduit 214 and the muffler outlet 420 are nearly coaxial with one another, which facilitates the flow of the exhaust gas from the exhaust flow path 230 to the atmosphere. Allowing the exhaust gas to flow through the exhaust flow path 230 may assist in reducing an amount of backpressure appearing in the exhaust system 200a compared to a situation where the exhaust gas flows through the exhaust flow path 220. Backpressure is understood to be the resistance to the flow of the exhaust gas between the engine 26 and the muffler outlet 420 due, at least in part, to twists, bends, obstacles, turns and right angles present in the various components of the exhaust system 200. In present technology, reducing backpressure can assist in optimizing performance of the engine 26, as high backpressure can negatively impact the efficiency of the engine performance Reducing the amount of backpressure in the exhaust system 200a may also have the effect of reducing what is known as "turbo lag", which is a delay in the response of a turbocharged engine after the throttle lever 86 has been moved for operating the throttle system.

Furthermore, under certain conditions, when the exhaust gas flows through the exhaust flow path 230, the muffler 400 reduces the noise emitted by the engine 26 and/or the exhaust gas flowing to the atmosphere, but to a lesser extent than when the exhaust gas flows through the exhaust flow path 220 since the exhaust gas flows only through the expansion chamber 408 and one of the chambers 412 before flowing to the atmosphere.

An illustrative scenario of the operation of the snowmobile 10 having the air intake system 100 and the exhaust system 200a is described below with reference to FIG. 12. It is to be noted that the components schematically shown in FIG. 12 are not to scale and could be configured otherwise than what is presented herein. The following scenario, and the further description of different implementations of the exhaust system 200, describe how the flow of exhaust gas from the engine 26 can be controlled using the exhaust system 200.

Referring to FIG. 12, air from the atmosphere enters the secondary airbox 110 through the inlet 112 as described above. When the atmospheric pressure is above a threshold atmospheric pressure, such as 1 Bar, which could be the case when the snowmobile 10 is ridden on a terrain nearly at sea level for example, the bypass valve 182 is open. Thus, the air from the atmosphere flows from the secondary airbox 110 to the primary airbox 120 through the bypass conduit 180, and thus bypasses the air compressor 310. The air flows through the primary airbox 120, through the path 144 defined in the intercooler 140, through the heat exchanger engine air outlets 134 and on to the engine air inlets 27. Combustion events occur in the engine 26 and the exhaust gas resulting from the combustion events is expelled through the engine exhaust outlets 29 in the exhaust pipe 202.

In this scenario, the bypass valve 182 and the primary valve 222 are open, and the secondary valve 232 is closed. The exhaust gas flows through the exhaust flow path 220 to the expansion chamber 406, the conduits 410 and chambers 412, the expansion chamber 408, the muffler outlet 420 and to the atmosphere. Since the secondary valve 232 is closed, the exhaust turbine 350 is prevented from spooling as the exhaust gas cannot flow through the exhaust flow path 230. The air compressor 310 is also prevented from spooling and the engine 62 is thus operated as a naturally aspirated engine. As such, when the primary valve 222 is open and the secondary valve 232 is closed, the exhaust gas flows sequentially from the engine 26 to the exhaust pipe 202, through the exhaust flow path 220, the expansion chambers 406, 408 of the muffler 400 and on to the atmosphere.

When the atmospheric pressure is below the threshold atmospheric pressure, such as when the snowmobile 10 is ridden on terrains having a high altitude for example, the bypass valve 182 is closed, the primary valve 222 is closed and the secondary valve 232 is open. Air from the atmosphere enters the secondary airbox 110 through the inlet 112, flows through the outlet 116 and enters the air compressor 310 through the inlet 312. The air is compressed by the air compressor 310 and is heated up because of the compression. The compressed air then flows through the outlet 314 into the conduit 316 and through the heat exchanger engine air inlet 132. The compressed air flows in the heat exchanger 130 through the path 144 and is cooled by the air flowing through the path 146 in the intercooler 140. The cooled compressed air flows through the heat exchanger engine air outlets 134 and on to the engine air inlets 27. Combustion events occur in the engine 26 and the exhaust gas resulting from the combustion events are expelled through the engine exhaust outlets 29 in the exhaust pipe 202. The exhaust gas flows through the pipe outlet 206, and through the exhaust flow path 230. Thus, the exhaust gas flows through the exhaust turbine inlet 352 and makes the exhaust turbine 350 spool. The housing 302 of the turbocharger 300 is heated up as the exhaust gas flows past the exhaust turbine 350, as described above. The exhaust gas flows through the exhaust turbine outlet 354 into the secondary exhaust conduit 214 and along the exhaust flow path 230. The exhaust gas flows through the exhaust flow path 230 until the muffler inlet 404, enters the expansion chamber 408 and is expelled to the atmosphere through the muffler outlet 420. As such, when the primary valve 222 is closed and when the secondary valve 232 is open, the exhaust gas flows sequentially from the engine 26 to the exhaust pipe 202, through the exhaust flow path 230 including the exhaust turbine 350, through the expansion chamber 408 and one of the expansion chambers 412 of the muffler 400 and on to the atmosphere.

It is contemplated that when the secondary valve 232 is open, the primary valve 222 could be selectively open in order to allow a portion of the exhaust gas flowing through the exhaust pipe 202 to flow through the exhaust flow path 220. Such controlled opening of the primary valve 222 could regulate the operation of the turbocharger 300, and thus regulate the amount of compressed air sent to the engine 26. In some implementations, opening the primary valve 222 could aid in decreasing backpressure when the turbocharger 300 is not spooling. Under certain conditions, the blow-off valve 172 and/or the bypass valve 182 could be open as well.

The primary and secondary valves 222, 232 are selectively movable between open and closed positions depending on a threshold engine operating condition and/or a threshold atmospheric pressure. With reference to FIG. 12, the selective controlling of the primary and secondary valves 222, 232 is operated by a system controller 500 operatively connected to an engine control unit (or E.C.U.) 502 and/or the electrical system (not shown) of the snowmobile 10. The engine control unit 502 is operatively connected to the engine 26. The system controller 500 is operatively connected to an atmospheric pressure sensor 504. The primary valve 222 is moved between the open and closed positions by a motor 522 operatively connected to the system controller 500. The secondary valve 232 is moved between the open and closed positions by a motor 532 operatively connected to the system controller 500. The bypass valve 182 is operatively connected to a motor 582 for moving the bypass valve 182, and the motor 582 is operatively connected to the system controller 500. When the atmospheric pressure sensor 504 detects that the atmospheric pressure threshold is reached, the atmospheric pressure sensor 504 sends an electronic signal to the system controller 500. The system controller 500 then executes a program stored in memory to control the motor 522 and/or the motor 532 for selectively controlling the primary and secondary valves 222, 232. The program executed by the system controller 500 may be based on control maps and/or algorithms stored in the memory. Other configurations of the system controller 500, engine control unit 502, atmospheric pressure sensor 504 and motors 522, 532 are contemplated.

It is contemplated that in a situation where the throttle lever 86 is moved such that a high power request is made to the engine 26, for example during acceleration of the snowmobile 10, the primary valve 222 could be closed and the secondary valve 232 could be open for causing the turbocharger 300 to spool up and feed compressed air to the engine 26. The engine 26 would then benefit from a denser intake charge and would have increased power output compared to a similar engine that would be naturally aspirated. Then, if the throttle lever 86 were to be released, the primary valve 222 could be opened in order to reduce the amount of exhaust gas flowing through the exhaust flow path 230 in order for the turbocharger 300 to spool down more rapidly, since the exhaust turbine 350 and the air compressor 310 are spooling but are no longer required. Reducing the amount of exhaust gas flowing through the exhaust flow path 230 while the turbocharger 350 is spooling down could reduce the amount of backpressure in the exhaust system 200a.

It is contemplated that the threshold atmospheric pressure may be a predetermined range of atmospheric pressure. In such an implementation, the primary and secondary valves 222, 232 are configured to remain in their current positions when the atmospheric pressure passes the mark of the upper and lower limits of the predetermined range of atmospheric pressure. For example, in implementations where the predetermined range of atmospheric pressure is between 800 and 1000 mBar, the exhaust system 200a is configured to close the secondary valve 232 when the atmospheric pressure is above 1000 mBar, thus preventing operation of the turbocharger 300. When the atmospheric pressure is between 800 and 1000 mBar, the secondary valve 232 remains in its current closed position. The exhaust system 200a is configured to open the secondary valve 232 when the atmospheric pressure is below 800 mBar, thus permitting operation of the turbocharger 300. It is contemplated that in some implementations the secondary valve 232 could be open when the atmospheric pressure is between 800 and 1000 mBar and the engine 26 is operated above the threshold operating condition of the engine 26. The threshold operating condition of the engine 26 could be, for example, a threshold engine speed.

An exemplary scenario regarding these aspects is provided for better understanding. Initially, when the snowmobile 10 is ridden at a first altitude where the atmospheric pressure is 1040 mBar, the secondary valve 232 is closed. Then, when the snowmobile is ridden at a second altitude where the atmospheric pressure decreases to 950 mBar, such as when climbing a mountain, the secondary valve 232 remains in its current closed position. When the snowmobile is ridden at a third altitude where the atmospheric pressure drops to 790 mBar, the secondary valve 232 opens when the atmospheric pressure passes the 800 mBar mark. In this situation, the snowmobile 10 benefits from the engine 26 receiving a denser intake charge because of the operation of the turbocharger 300, thus increasing the power output of the engine 26 compared to a similar engine that would be naturally aspirated.

When the snowmobile 10 is ridden from the third altitude to the second altitude, the atmospheric pressure may increase from 790 mBar to 950 mBar. The secondary valve 232 remains in its current open position when the atmospheric pressure passes the 800 mBar mark. When the snowmobile 10 is ridden from the second altitude to the first altitude, the atmospheric pressure increases from 950 mBar to 1040 mBar. The secondary valve 232 is closed when the atmospheric pressure passes the 1000 mBar mark.

Having the secondary valve 232 opening and closing in accordance with the above example may assist in preventing the secondary valve 232 to open and close repeatedly when the atmospheric pressure is near the threshold atmospheric pressure.

Figure 14:
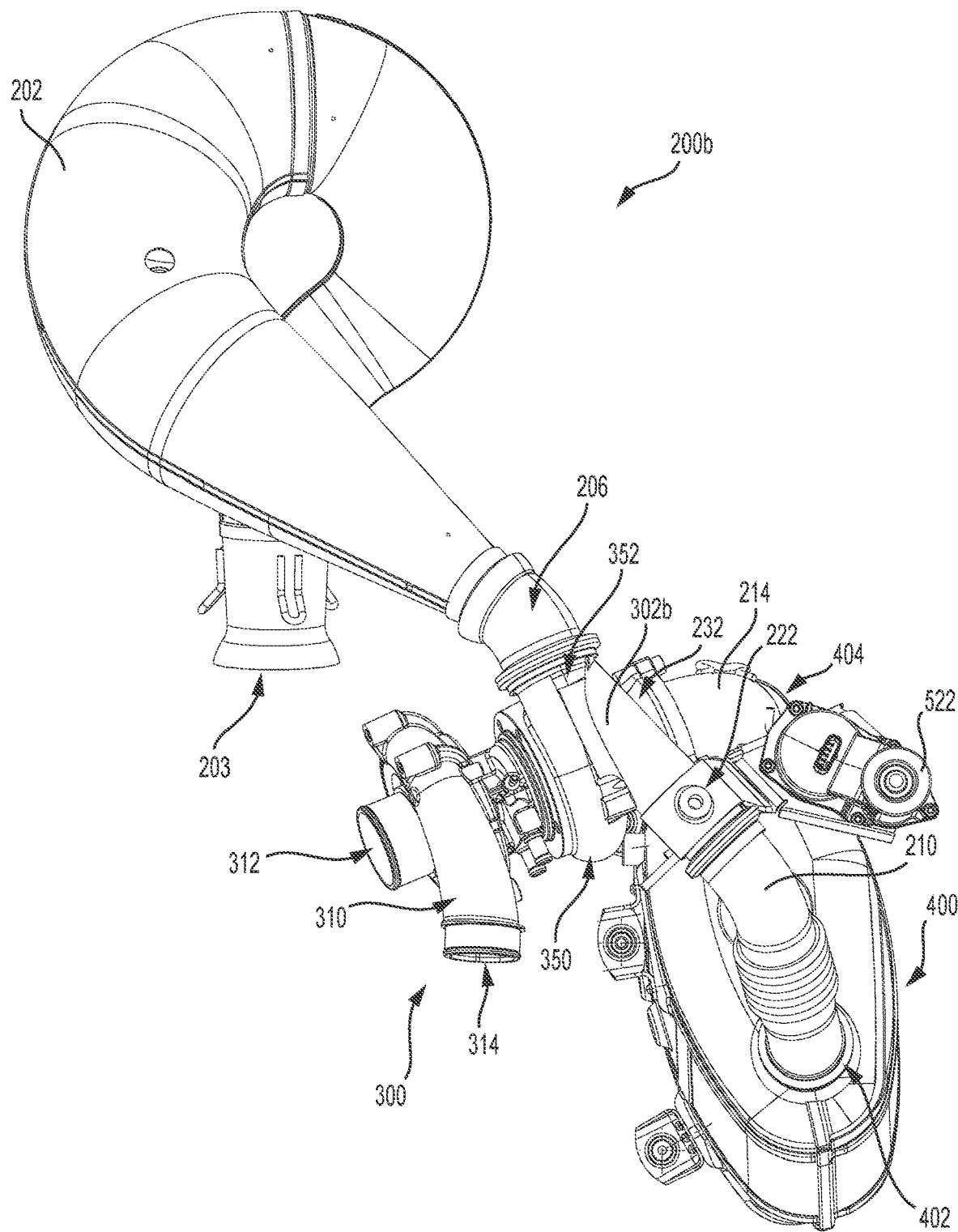
FIG. 14 is a top plan view of a second implementation of the exhaust system of FIG. 10.
Figure 15:
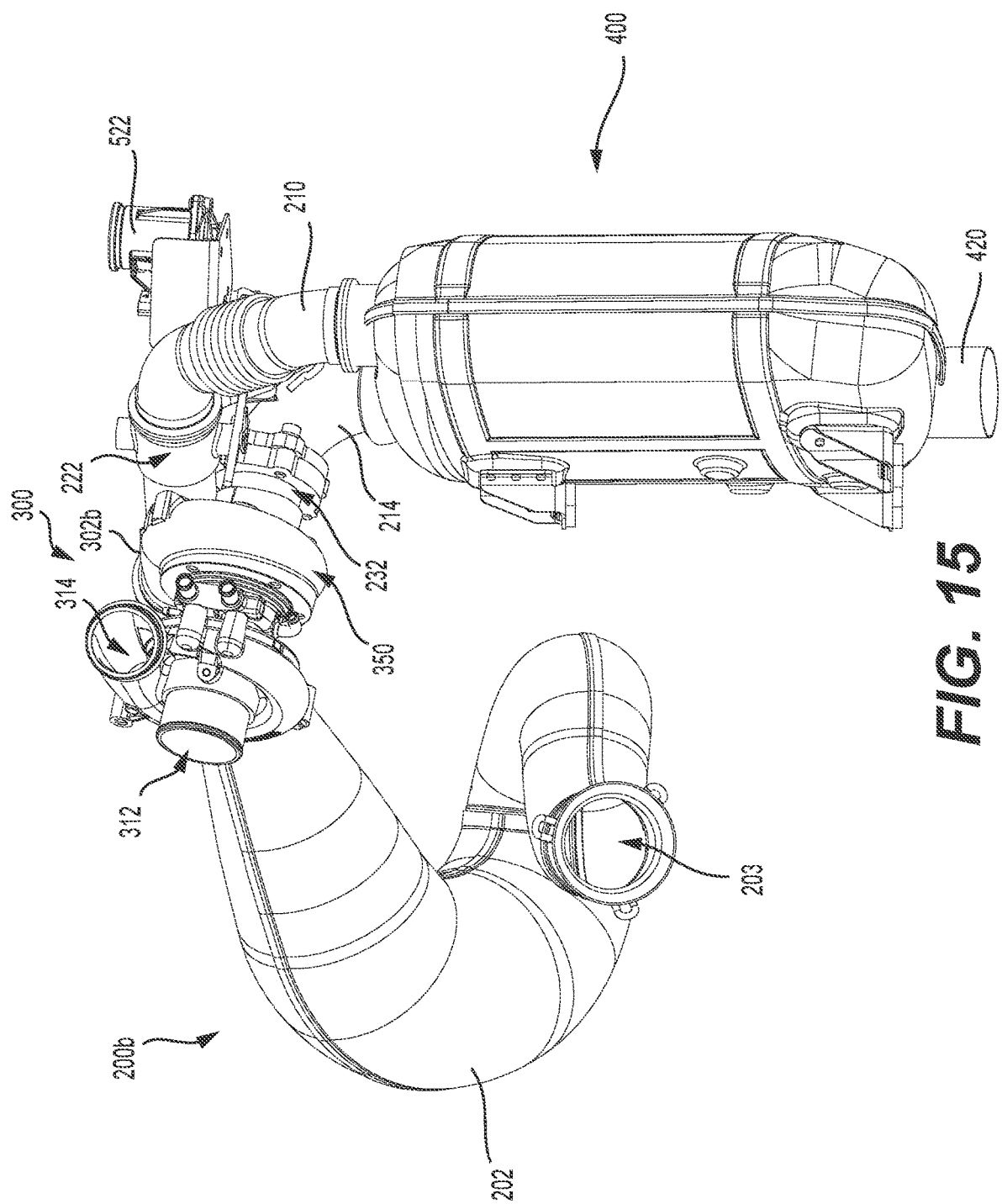
FIG. 15 is a rear elevation view of the exhaust system of FIG. 14.
Figure 16:
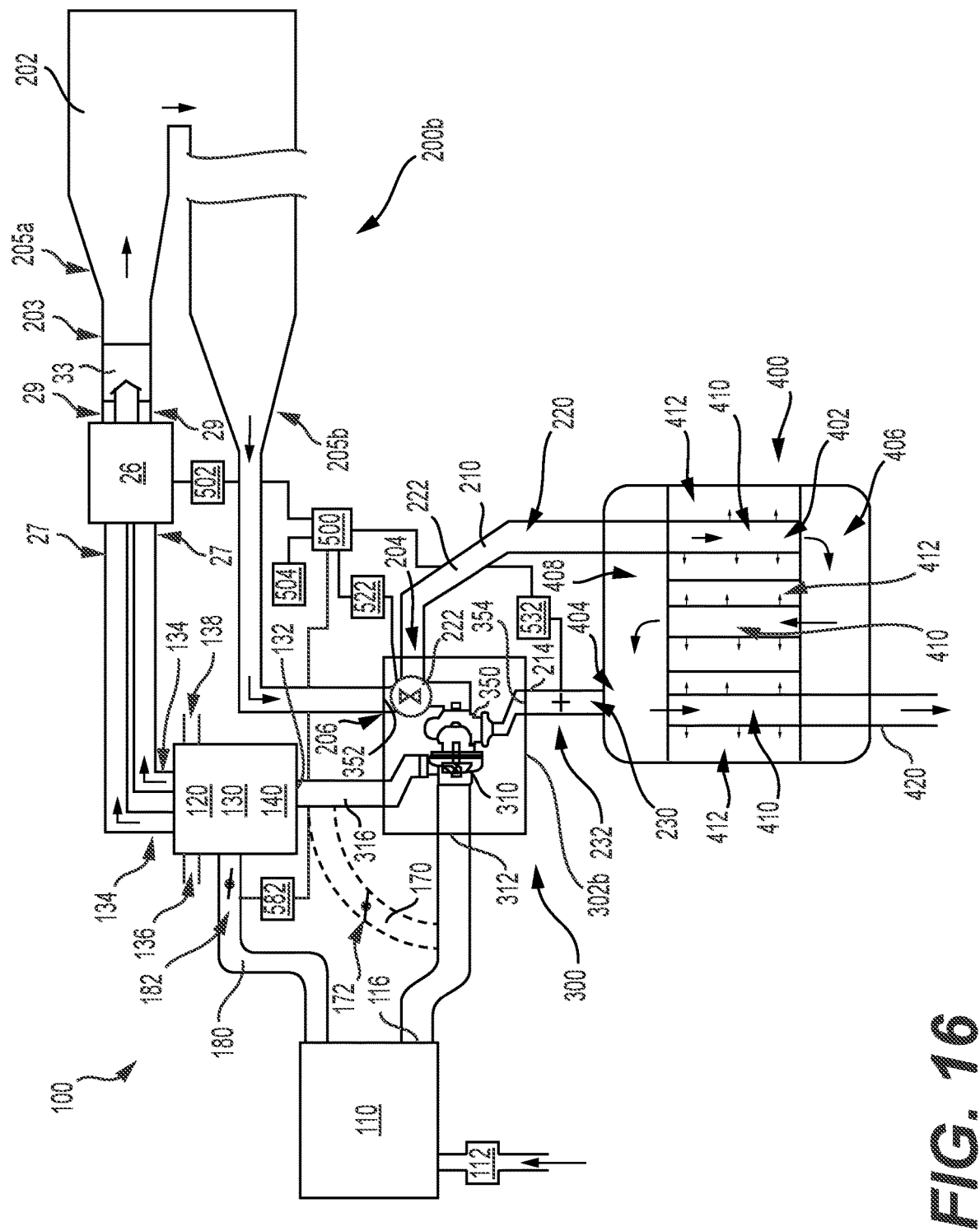
FIG. 16 is a schematic representation of the air intake system of FIG. 3 and of the exhaust system of FIG. 14.

Referring to FIGS. 14 to 16, a second implementation 200b of the exhaust system 200 will be described. Various components described in relation to the first implementation of the exhaust system 200a are found in the exhaust system 200b, have the same functions and will not be described in detail, unless mentioned otherwise.

In the exhaust system 200b, the turbocharger 300 has a housing 302b that differs from the housing 302 shown in FIG. 11 in that the housing 302b defines the pipe outlet 204 and includes the primary valve 222. The primary pipe conduit 210 is fluidly connected between the pipe outlet 204 and the muffler inlet 402, and defines at least a portion of the exhaust flow path 220. As can be seen in FIGS. 11 and 14, the exhaust system 200b is a more compact package compared to the exhaust system 200a. The operation and the flow characteristics of the exhaust system 200b are similar to the ones of the exhaust system 200a. Thus, the primary and secondary valves 222, 232 are operated as described above with respect to the exhaust system 200a. As such, the valves 222, 232 can be selectively closed or open depending on the atmospheric pressure and/or a threshold engine speed for controlling the flow of exhaust gas along the exhaust flow paths 220, 230.

Figure 17:
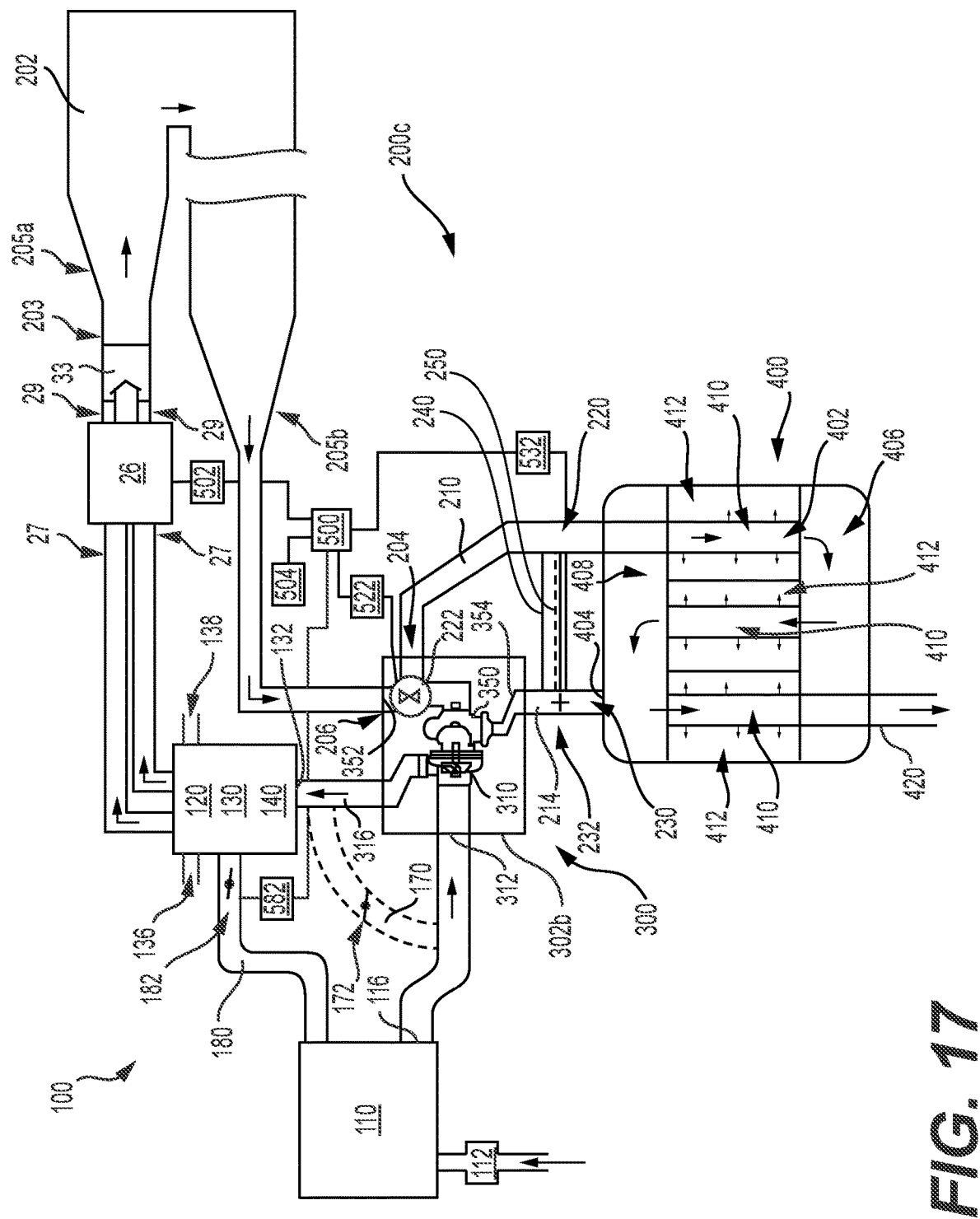
FIG. 17 is a schematic representation of the air intake system of FIG. 3, and of a third implementation of the exhaust system of FIG. 10.

Referring to FIG. 17, a third implementation 200c of the exhaust system 200 will be described. Various components described in relation to the second implementation of the exhaust system 200*b* are found in the exhaust system 200*c*, have the same functions and will not be described in detail, unless mentioned otherwise.

The exhaust system 200*c* has a transfer conduit 240 (also referred to as a "bridge pipe") fluidly connecting the primary and secondary exhaust conduits 210, 214. The transfer conduit 240 is positioned downstream from the primary valve 222 and upstream from the secondary valve 232. In situations where the turbocharger 300 is not required but is spooling down, such as when the throttle lever 86 has just been released as described above, the secondary valve 232 is open and the primary valve 222 could, under certain circumstances, be opened. When the primary valve 222 is open, a portion of the exhaust gas flowing through the exhaust flow path 220 flows through an exhaust flow path 250 defined at least partially by the transfer conduit 240 and the secondary exhaust conduit 214. The exhaust gas flowing through the exhaust flow path 250 flows through the transfer conduit 240, the secondary exhaust conduit 214, the muffler inlet 404, the expansion chamber 408, one of the conduits 410 and on to the atmosphere through the muffler outlet 420. The exhaust flow path 250 is more direct than the exhaust flow path 220 as it bypasses the expansion chamber 406 and at least some of the conduits 410 of the muffler 400. The exhaust flow path 250 also bypasses the exhaust turbine 350 and may assist in reducing the amount of backpressure in the exhaust system 200*c*. As such, by selectively moving the primary and secondary valves 222, 232, the exhaust gas can flow from the exhaust flow path 220 to the exhaust flow path 230.

It is contemplated that, under certain circumstances, the primary valve 222 could be closed, the secondary valve 232 could be closed and the turbocharger 300 could be operated. In such situations, the exhaust gas exiting the exhaust turbine 350 and flowing through the secondary exhaust conduit 214 could flow through the transfer conduit 240, and in the muffler 400 through the muffler inlet 402. The exhaust gas could then flow through the expansion chamber 406, the conduits 410 and the chambers 412, the expansion chamber 408 and on to the atmosphere. As such, by selectively moving the primary and secondary valves 222, 232, the exhaust gas can flow from the exhaust flow path 230 to the exhaust flow path 220. The muffler 400 could reduce the noise emitted by the engine 26 and/or the exhaust gas flowing to the atmosphere to a greater extent than when the exhaust gas flows through the exhaust flow path 230 when the turbocharger 300 is in operation. However, it is contemplated that such configuration of the exhaust system 200*c* could increase an amount of backpressure therein compared to the above example.

Figure 18:
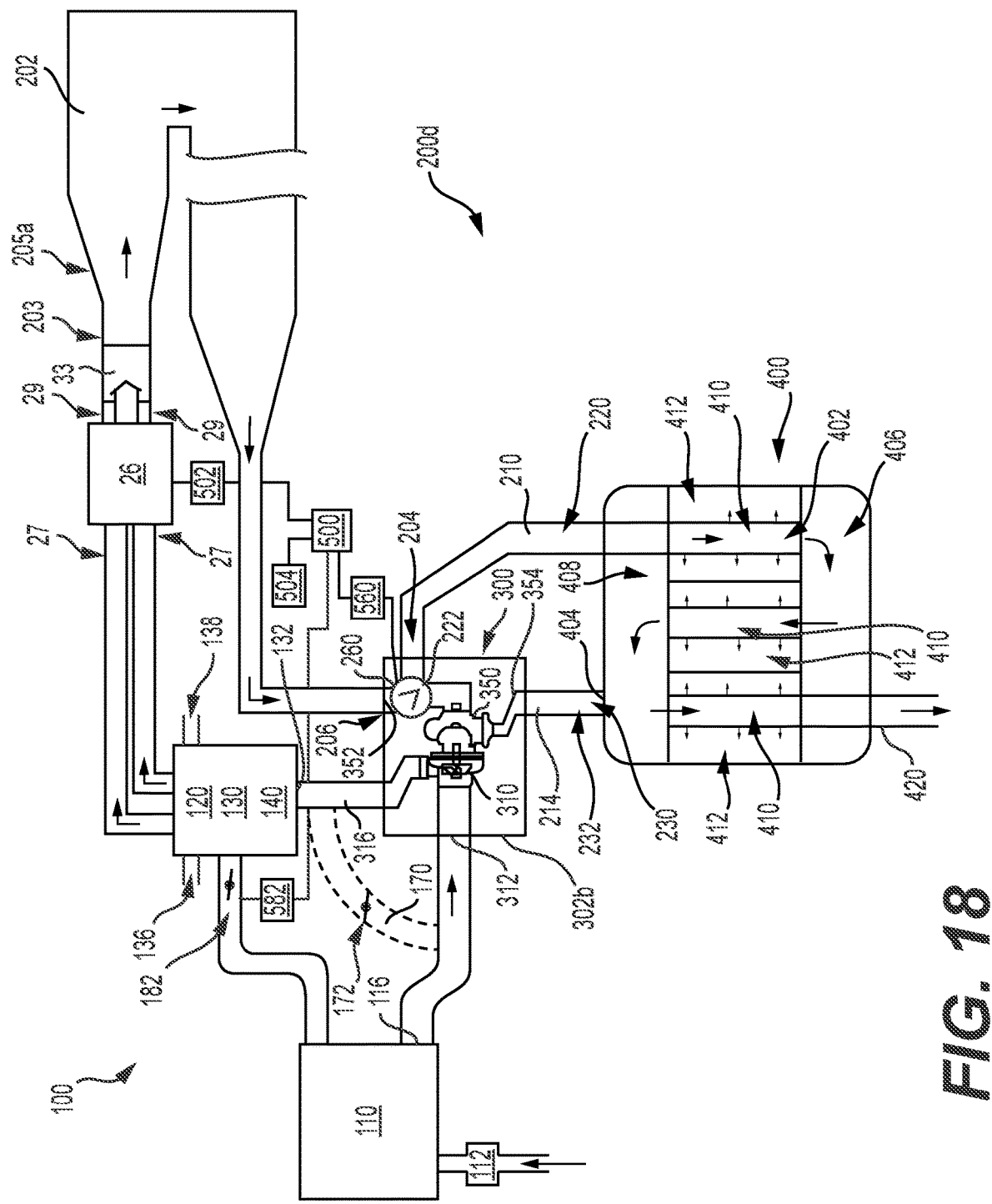
FIG. 18 is a schematic representation of the air intake system of FIG. 3, and of a fourth implementation of the exhaust system of FIG. 10.

Referring to FIG. 18, a fourth implementation 200*d* of the exhaust system 200 will be described. Various components described in relation to the second implementation of the exhaust system 200*b* are found in the exhaust system 200*d*, have the same functions and will not be described in detail, unless mentioned otherwise.

The exhaust flow path 220 extends from the exhaust flow path 230. The primary and secondary valves 222, 232 are omitted and a valve 260 is positioned at the fluid junction of the exhaust flow paths 220, 230. The valve 260 is an inverted valve that is movable for simultaneously controlling the flow of exhaust gas flowing through the exhaust flow paths 220, 230. A motor 560 is operatively connected to the inverted valve 260 and to the system controller 500 for selectively moving the inverted valve 260. The inverted valve 260 is movable between a first position for causing the exhaust gas to flow through the exhaust flow path 220, and a second position for causing the exhaust gas to flow through the exhaust flow path 230. The inverted valve 260 can also be moved into a plurality of intermediate positions between the first and second positions for selectively controlling the flow of the exhaust gas flowing simultaneously through the exhaust flow paths 220, 230. Thus, when the inverted valve 260 is in one of the intermediate positions, a portion of the exhaust gas flows through the exhaust flow path 220, and the remainder portion of the exhaust gas flows through the exhaust flow path 230. In such circumstances, the inverted valve 260 can regulate the operation of the turbocharger 300 and thus regulate the amount of compressed air sent to the engine 26 while simultaneously controlling the flow of the exhaust gas through the exhaust flow paths 220, 230. The inverted valve 260 cannot be moved to a position preventing the flow of the exhaust through both the exhaust flow paths 220, 230 simultaneously.

Under certain circumstances, the exhaust system 200*d* is simpler to operate than the exhaust systems 200*a*, 200*b*, 200*c* including the primary and secondary valves 222, 232 since only the inverted valve 260 has to be moved for selectively controlling the flow of exhaust gas through the exhaust flow path 220 and/or the exhaust flow path 230.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A snowmobile comprising:
   a frame including a tunnel, the tunnel having a passage defined therethrough;
   at least one ski connected to the frame;
   an engine supported by the frame and having an engine air inlet;
   a rear suspension assembly operatively connected to the tunnel; and
   a drive track supported by the rear suspension assembly and disposed at least in part below the tunnel, the drive track being operatively connected to the engine; and
   a heat exchanger connected to the tunnel, the heat exchanger comprising:
      a heat exchanger engine air inlet fluidly connected to atmosphere;
      a heat exchanger engine air outlet fluidly connected between the heat exchanger engine air inlet and the engine air inlet;
      a cooling air inlet fluidly connected to the atmosphere; and
      a cooling air outlet fluidly connected between the cooling air inlet and the passage of the tunnel.

2. The snowmobile of claim 1, wherein an air from the heat exchanger engine air inlet to the heat exchanger engine air outlet is cooled by an air from the cooling air inlet to the cooling air outlet.

3. The snowmobile of claim 1, wherein the an air inside the heat exchanger from the heat exchanger engine air inlet to the heat exchanger engine air outlet is fluidly separate from an air inside the heat exchanger from the cooling air inlet to the cooling air outlet.

4. The snowmobile of claim 1, further comprising an intercooler disposed inside the heat exchanger, the intercooler defining a first path for air flowing from the cooling air inlet to the cooling air outlet, and the intercooler defining a second path for air flowing from the heat exchanger engine air inlet to the heat exchanger engine air outlet, the first path being fluidly separate from the second path, and the first path being in thermal communication with the second path.

5. The snowmobile of claim 4, wherein the first path is perpendicular to the second path.

6. The snowmobile of claim 1, wherein:
the tunnel comprises a left side portion and a right side portion; and
the cooling air inlet and the cooling air outlet are disposed laterally between the left and right side portions.

7. The snowmobile of claim 6, wherein:
the tunnel further comprises a top portion connected between the left and right side portions; and
the cooling air inlet and the cooling air outlet are disposed vertically higher than the top portion.

8. The snowmobile of claim 7, wherein, when the snowmobile is being propelled, rotation of the drive track creates a low pressure zone near the passage, the low pressure zone inducing air to flow into the heat exchanger through the cooling air inlet, exit the heat exchanger through the cooling air outlet and to flow through the passage.

9. The snowmobile of claim 8, wherein:
the passage is defined in the top portion;
a protrusion is defined rearwardly of the passage on a bottom face of the top portion; and
the low pressure zone is forward of the protrusion.

10. The snowmobile of claim 1, wherein the heat exchanger is connected to a forward portion of the tunnel.

11. The snowmobile of claim 1, wherein the snowmobile further comprises a front axle operatively connected between the engine and the drive track, the passage being above the front axle and being longitudinally aligned with the front axle.

12. The snowmobile of claim 1, wherein the snowmobile further comprises an air compressor fluidly connected between an atmosphere and the heat exchanger engine air inlet to deliver compressed air to the engine via the heat exchanger.

13. The snowmobile of claim 12, wherein:
the air compressor is part of a turbocharger;
the engine comprises an engine exhaust outlet fluidly connected to the turbocharger; and
a flow of exhaust gas flows out of the engine through the engine exhaust outlet for operating the turbocharger, and then to the atmosphere via the turbocharger.

* * * * *

UNITED STATES PATENT AND TRADEMARK OFFICE
CERTIFICATE OF CORRECTION

| | |
|---|---|
| PATENT NO. | : 10,865,700 B2 |
| APPLICATION NO. | : 16/031126 |
| DATED | : December 15, 2020 |
| INVENTOR(S) | : Michel Lefebvre et al. |

It is certified that error appears in the above-identified patent and that said Letters Patent is hereby corrected as shown below:

On the Title Page

Item (72):
The listing of inventors should read:
--Michel Lefebvre, Valcourt (CA);
Jonathan Claveau, Cowansville (CA)--.

Signed and Sealed this
Twenty-sixth Day of December, 2023

*Katherine Kelly Vidal*

Katherine Kelly Vidal
*Director of the United States Patent and Trademark Office*